(12) United States Patent
Witt

(10) Patent No.: US 6,553,482 B1
(45) Date of Patent: Apr. 22, 2003

(54) UNIVERSAL DEPENDENCY VECTOR/ QUEUE ENTRY

(75) Inventor: David B. Witt, Austin, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 14 days.

(21) Appl. No.: 09/723,712

(22) Filed: Nov. 27, 2000

Related U.S. Application Data

(63) Continuation of application No. 09/139,178, filed on Aug. 24, 1998, now Pat. No. 6,212,623.

(51) Int. Cl.[7] ................................................. G06F 9/38
(52) U.S. Cl. ........................ 712/216; 712/214; 712/217; 712/225
(58) Field of Search ............................... 712/216, 217, 712/225, 214

(56) References Cited

U.S. PATENT DOCUMENTS

| | | | |
|---|---|---|---|
| 4,521,851 A | 6/1985 | Trubisky et al. | 712/218 |
| 4,594,660 A | 6/1986 | Guenthner et al. | 712/23 |
| 5,404,470 A | 4/1995 | Miyake | 712/217 |
| 5,465,336 A | 11/1995 | Imai et al. | 712/216 |
| 5,467,473 A | 11/1995 | Kahle et al. | 712/23 |
| 5,555,432 A | 9/1996 | Hinton et al. | 712/216 |
| 5,651,125 A | 7/1997 | Witt et al. | 712/218 |
| 5,655,096 A | 8/1997 | Branigin | 712/200 |
| 5,710,902 A | 1/1998 | Sheaffer et al. | 712/216 |
| 5,717,883 A | 2/1998 | Sager | 712/218 |
| 5,748,978 A | 5/1998 | Narayan et al. | 712/23 |
| 5,751,985 A | 5/1998 | Shen et al. | 712/218 |
| 5,799,165 A | 8/1998 | Favor et al. | 712/214 |
| 5,835,747 A | 11/1998 | Trull | 712/216 |
| 5,872,946 A | 2/1999 | Narayan et al. | 712/204 |
| 5,884,059 A | 3/1999 | Favor et al. | 712/215 |
| 5,884,060 A | 3/1999 | Vegesna et al. | 712/215 |
| 5,884,061 A | 3/1999 | Hesson et al. | 712/217 |
| 5,923,862 A | 7/1999 | Nguyen et al. | 712/208 |
| 5,941,983 A | 8/1999 | Gupta et al. | 712/214 |
| 5,951,675 A | 9/1999 | Narayan et al. | 712/215 |
| 5,978,900 A | * 11/1999 | Liu et al. | 712/216 |
| 5,987,594 A | 11/1999 | Panwar et al. | 712/216 |
| 5,996,068 A | 11/1999 | Dwyer, III et al. | 712/228 |
| 6,016,540 A | 1/2000 | Zaidi et al. | 712/214 |
| 6,065,105 A | * 5/2000 | Zaidi et al. | 712/23 |
| 6,085,311 A | 7/2000 | Narayan et al. | 712/204 |
| 6,098,166 A | 8/2000 | Leibholz et al. | 712/216 |
| 6,108,769 A | * 8/2000 | Chinnakonda et al. | 712/216 |
| 6,122,727 A | 9/2000 | WItt | 712/214 |
| 6,212,622 B1 | 4/2001 | Witt | 712/216 |
| 6,212,623 B1 | 4/2001 | Witt | 712/216 |
| 6,308,259 B1 | 10/2001 | Witt | 712/214 |

FOREIGN PATENT DOCUMENTS

| | | |
|---|---|---|
| WO | 97/27538 | 7/1997 |
| WO | 00/11548 | 3/2000 |

OTHER PUBLICATIONS

Gwennap, L., "Digital 21264 Sets New Standard: Clock Speed, Complexity, Performance Surpass Records, But Still A Year Away," Microprocesser Forum, Microdesign Resources, Oct. 28, 1996, Microprocessor Report, vol. 10, No. 14, pp. 103–108.

Johnson, *Superscalar Microprocessor Design*, Prentice–Hall, 1991, pp. 127–129.

* cited by examiner

*Primary Examiner*—Kenneth S. Kim
(74) *Attorney, Agent, or Firm*—Conley, Rose & Tayon, PC; Lawrence J. Merkel

(57) ABSTRACT

A processor employs an instruction queue and a dependency vector generation unit. The dependency vector generation unit generates a dependency vector for each instruction operation. Particularly, a dependency vector corresponding to a first instruction operation may be indicative of an ordering dependency between the first instruction operation and a prior instruction operation even if the first instruction operation does not have an operand dependency on the prior instruction operation. The instruction queue inhibits dependencies until each dependency within the dependency vector is satisfied.

34 Claims, 9 Drawing Sheets

UNIVERSAL DEPENDENCY VECTOR/QUEUE ENTRY

This application is a continuation of U.S. Ser. No. 09/139,178 filed Aug. 24, 1998. U.S. Pat. No. 6,212,623.

BACKGROUND OF THE INVENTION

1. Field of the Invention

This invention is related to the field of processors and, more particularly, to instruction scheduling mechanisms in processors.

2. Description of the Related Art

Superscalar processors attempt to achieve high performance by issuing and executing multiple instructions per clock cycle and by employing the highest possible clock frequency consistent with the design. One method for increasing the number of instructions executed per clock cycle is out of order execution. In out of order execution, instructions may be executed in a different order than that specified in the program sequence (or "program order"). Certain instructions near each other in a program sequence may have dependencies which prohibit their concurrent execution, while subsequent instructions in the program sequence may not have dependencies on the previous instructions. Accordingly, out of order execution may increase performance of the superscalar processor by increasing the number of instructions executed concurrently (on the average).

Unfortunately, scheduling instructions for out of order execution presents additional hardware complexities for the processor. The term "scheduling" generally refers to selecting an order for executing instructions. Typically, the processor attempts to schedule instructions as rapidly as possible to maximize the average instruction execution rate (e.g. by executing instructions out of order to deal with dependencies and hardware availability for various instruction types). These complexities may limit the clock frequency at which the processor may operate. In particular, the dependencies between instructions must be respected by the scheduling hardware. Generally, as used herein, the term "dependency" refers to a relationship between a first instruction and a subsequent second instruction in program order which requires the execution of the first instruction prior to the execution of the second instruction. A variety of dependencies may be defined. For example, an operand dependency occurs if a source operand of the second instruction is the destination operand of the first instruction.

Generally, instructions may have one or more source operands and one or more destination operands. The source operands are input values to be manipulated according to the instruction definition to produce one or more results (which are the destination operands). Source and destination operands may be memory operands stored in a memory location external to the processor, or may be register operands stored in register storage locations included within the processor. The instruction set architecture employed by the processor defines a number of architected registers. These registers are defined to exist by the instruction set architecture, and instructions may be coded to use the architected registers as source and destination operands. An instruction specifies a particular register as a source or destination operand via a register number (or register address) in an operand field of the instruction. The register number uniquely identifies the selected register among the architected registers. A source operand is identified by a source register number and a destination operand is identified by a destination register number.

In addition to operand dependencies, one or more types of ordering dependencies may be enforced by a processor. Ordering dependencies may be used, for example, to simplify the hardware employed or to generate correct program execution. By forcing certain instructions to be executed in order with respect to other instructions, hardware for handling consequences of the out of order execution of the instructions may be omitted. For example, if load memory operations are allowed to be performed out of order with respect to store memory operations, hardware may be required to detect a prior store memory operation which updates the same memory location accessed by a subsequent load memory operation (which may have been performed out of order). Generally, ordering dependencies may vary from microarchitecture to microarchitecture.

Scheduling becomes increasingly difficult to perform at high frequency as larger numbers of instructions are allowed to be "in flight" (i.e. outstanding within the processor). Dependencies between instructions may be more frequent due to the larger number of instructions which have yet to be completed. Furthermore, detecting the dependencies among the large number of instructions may be more difficult, as may be detecting when the dependencies have been satisfied (i.e. when the progress of one instruction has proceeded to the point that the dependency need not prevent the scheduling of another instruction). A scheduling mechanism amendable to high frequency operation is therefore desired.

Additionally, a scheduling mechanism is desired which may handle the large variety of ordering dependencies that may be imposed by the microarchitecture. The ordering dependencies, in addition to the operand dependencies, may result in a particular instruction being dependent upon a relatively large number of prior instructions. Accordingly, a flexible scheduling mechanism allowing for a wide variety of dependencies is desired.

SUMMARY OF THE INVENTION

The problems outlined above are in large part solved by a processor employing an instruction queue and dependency vectors therein which allow a flexible dependency recording structure. The dependency vector includes a dependency indication for each instruction queue entry, which may advantageously provide a universal mechanism for scheduling instruction operations. An arbitrary number of dependencies may be recorded for a given instruction operation, up to a dependency upon each other instruction operation. Since the dependency vector is configured to record an arbitrary number of dependencies, a given instruction operation can be ordered with respect to any other instruction operation. Accordingly, any architectural or microarchitectural restrictions upon concurrent execution or upon order of particular instruction operations in execution may be enforced. If, during the development of a processor implementation, it becomes desirable to add additional execution order restrictions (e.g. to simplify the implementation), the additional restrictions may be accommodated by indicating ordering dependencies within the dependency vector. The instruction queues evaluate the dependency vectors and request scheduling for each instruction operation for which the recorded dependencies have been satisfied. The enhanced flexibility may improve the suitability of the instruction queues for a variety of processor implementations.

Broadly speaking, the present invention contemplates a processor comprising a dependency vector generation unit and an instruction queue. The dependency vector generation unit is configured to generate a dependency vector corresponding to an instruction operation. Coupled to receive the dependency vector and the instruction operation, the instruction queue is configured to inhibit scheduling of the instruction operation until each dependency indicated within the dependency vector is satisfied. the dependency vector is capable of indicating dependencies upon an arbitrary number of other instruction operations within the instruction queue.

The present invention further contemplates a method for scheduling instruction operations in a processor. A dependency vector corresponding to each instruction operation is generated. The dependency vector indicates an arbitrary number of dependencies upon other instruction operations in an instruction queue. The dependency vector and a corresponding instruction operation are stored in the instruction queue. Each of the arbitrary number of dependencies indicated by the dependency vector are satisfied, and subsequently the corresponding instruction operation is scheduled (responsive to the satisfying of the dependencies).

BRIEF DESCRIPTION OF THE DRAWINGS

Other objects and advantages of the invention will become apparent upon reading the following detailed description and upon reference to the accompanying drawings in which.

Figure 1:
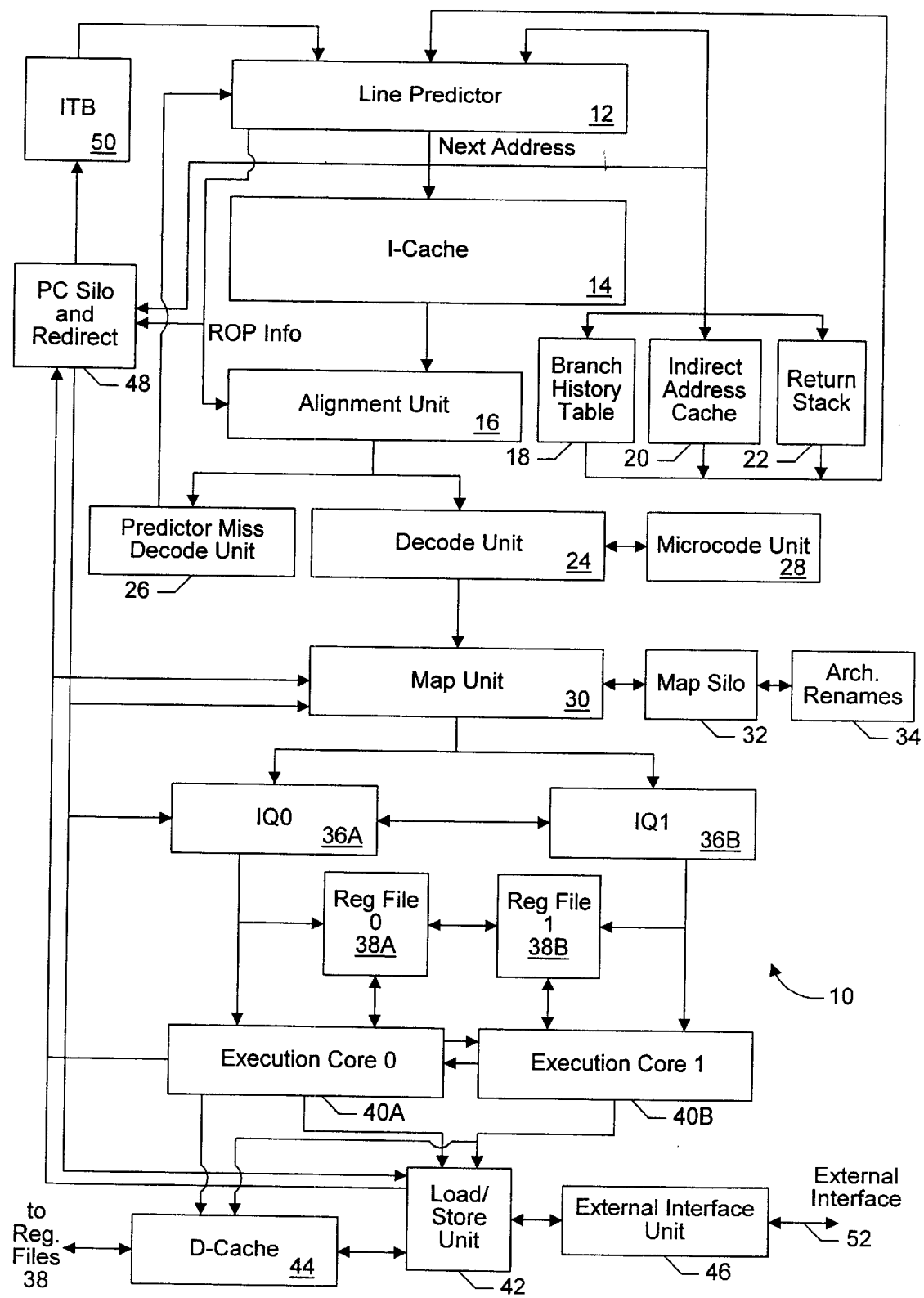
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a processor 10 is shown. Other embodiments are possible and contemplated. In the embodiment of FIG. 1, processor 10 includes a line predictor 12, an instruction cache (I-cache) 14, an alignment unit 16, a branch history table 18, an indirect address cache 20, a return stack 22, a decode unit 24, a predictor miss decode unit 26, a microcode unit 28, a map unit 30, a map silo 32, an architectural renames block 34, a pair of instruction queues 36A–36B, a pair of register files 38A–38B, a pair of execution cores 40A–40B, a load/store unit 42, a data cache (D-cache) 44, an external interface unit 46, a PC silo and redirect unit 48, and an instruction TLB (ITB) 50. Line predictor 12 is connected to ITB 50, predictor miss decode unit 26, branch history table 18, indirect address cache 20, return stack 22, PC silo and redirect block 48, alignment unit 16, and I-cache 14. I-cache 14 is connected to alignment unit 16. Alignment unit 16 is further connected to predictor miss decode unit 26 and decode unit 24. Decode unit 24 is further connected to microcode unit 28 and map unit 30. Map unit 30 is connected to map silo 32, architectural renames block 34, instruction queues 36A–36B, load/store unit 42, execution cores 40A–40B, and PC silo and redirect block 48. Instruction queues 36A–36B are connected to each other and to respective execution cores 40A–40B and register files 38A–38B. Register files 38A–38B are connected to each other and respective execution cores 40A–40B. Execution cores 40A–40B are further connected to load/store unit 42, data cache 44, and PC silo and redirect unit 48. Load/store unit 42 is connected to PC silo and redirect unit 48, D-cache 44, and external interface unit 46. D-cache 44 is connected to register files 38, and external interface unit 46 is connected to an external interface 52. Elements referred to herein by a reference numeral followed by a letter will be collectively referred to by the reference numeral alone. For example, instruction queues 36A–36B will be collectively referred to as instruction queues 36.

In the embodiment of FIG. 1, processor 10 employs a variable byte length, complex instruction set computing (CISC) instruction set architecture. For example, processor 10 may employ the x86 instruction set architecture (also referred to as IA-32). Other embodiments may employ other instruction set architectures including fixed length instruction set architectures and reduced instruction set computing (RISC) instruction set architectures. Certain features shown in FIG. 1 may be omitted in such architectures.

Line predictor 12 is configured to generate fetch addresses for I-cache 14 and is additionally configured to provide information regarding a line of instruction operations to alignment unit 16. Generally, line predictor 12 stores lines of instruction operations previously speculatively fetched by processor 10 and one or more next fetch addresses corresponding to each line to be selected upon fetch of the line. In one embodiment, line predictor 12 is configured to store 1K entries, each defining one line of instruction operations. Line predictor 12 may be banked into sub-units, if desired. (e.g. four banks of 256 entries each to allow concurrent read and update without dual porting).

Line predictor 12 provides the next fetch address to I-cache 14 to fetch the corresponding instruction bytes. I-cache 14 is a high speed cache memory for storing instruction bytes. According to one embodiment I-cache 14 may comprise, for example, a 256 Kbyte, four way set associative organization employing 64 byte cache lines. However, any I-cache structure may be suitable. Additionally, the next fetch address is provided back to line predictor 12 as an input to fetch information regarding the corresponding line of instruction operations. The next fetch address may be overridden by an address provided by ITB 50 in response to exception conditions reported to PC silo and redirect unit 48.

The next fetch address provided by the line predictor may be the address sequential to the last instruction within the line (if the line terminates in a non-branch instruction). Alternatively, the next fetch address may be a target address of a branch instruction terminating the line. In yet another alternative, the line may be terminated by return instruction, in which case the next fetch address is drawn from return stack 22.

Responsive to a fetch address, line predictor 12 provides information regarding a line of instruction operations beginning at the fetch address to alignment unit 16. Alignment unit 16 receives instruction bytes corresponding to the fetch address from I-cache 14 and selects instruction bytes into a set of issue positions according to the provided instruction operation information. More particularly, line predictor 12 provides a shift amount for each instruction within the line instruction operations, and a mapping of the instructions to the set of instruction operations which comprise the line. An instruction may correspond to multiple instruction operations, and hence the shift amount corresponding to that instruction may be used to select instruction bytes into multiple issue positions. An issue position is provided for each possible instruction operation within the line. In one embodiment, a line of instruction operations may include up to 8 instruction operations corresponding to up to 6 instructions. Generally, as used herein, a line of instruction operations refers to a group of instruction operations concurrently issued to decode unit 24. The line of instruction operations progresses through the pipeline of microprocessor 10 to instruction queues 36 as a unit. Upon being stored in instruction queues 36, the individual instruction operations may be executed in any order.

The issue positions within decode unit 24 (and the subsequent pipeline stages up to instruction queues 36) define the program order of the instruction operations within the line for the hardware within those pipeline stages. An instruction operation aligned to an issue position by alignment unit 16 remains in that issue position until it is stored within an instruction queue 36A–36B. Accordingly, a first issue position may be referred to as being prior to a second issue position if an instruction operation within the first issue position is prior to an instruction operation concurrently within the second issue position in program order. Similarly, a first issue position may be referred to as being subsequent to a second issue position if an instruction operation within the first issue position is subsequent to instruction operation concurrently within the second issue position in program order. Instruction operations within the issue positions may also be referred to as being prior to or subsequent to other instruction operations within the line.

As used herein, an instruction operation (or ROP) is an operation which an execution unit within execution cores 40A–40B is configured to execute as a single entity. Simple instructions may correspond to a single instruction operation, while more complex instructions may correspond to multiple instruction operations. Certain of the more complex instructions may be implemented within microcode unit 28 as microcode routines. Furthermore, embodiments employing non-CISC instruction sets may employ a single instruction operation for each instruction (i.e. instruction and instruction operation may be synonymous in such embodiments). In one particular embodiment, a line may comprise up to eight instruction operations corresponding to up to 6 instructions. Additionally, the particular embodiment may terminate a line at less than 6 instructions and/or 8 instruction operations if a branch instruction is detected. Additional restrictions regarding the instruction operations to the line may be employed as desired.

The next fetch address generated by line predictor 12 is routed to branch history table 18, indirect address cache 20, and return stack 22. Branch history table 18 provides a branch history for a conditional branch instruction which may terminate the line identified by the next fetch address. Line predictor 12 may use the prediction provided by branch history table 18 to determine if a conditional branch instruction terminating the line should be predicted taken or not taken. In one embodiment, line predictor 12 may store a branch prediction to be used to select taken or not taken, and branch history table 18 is used to provide a more accurate prediction which may cancel the line predictor prediction and cause a different next fetch address to be selected. Indirect address cache 20 is used to predict indirect branch target addresses which change frequently. Line predictor 12 may store, as a next fetch address, a previously generated indirect target address. Indirect address cache 20 may override the next fetch address provided by line predictor 12 if the corresponding line is terminated by an indirect branch instruction. Furthermore, the address subsequent to the last instruction within a line of instruction operations may be pushed on the return stack 22 if the line is terminated by a subroutine call instruction. Return stack 22 provides the address stored at its top to line predictor 12 as a potential next fetch address for lines terminated by a return instruction.

In addition to providing next fetch address and instruction operation information to the above mentioned blocks, line predictor 12 is configured to provide next fetch address and instruction operation information to PC silo and redirect unit 48. PC silo and redirect unit 48 stores the fetch address and line information and is responsible for redirecting instruction fetching upon exceptions as well as the orderly retirement of instructions. PC silo and redirect unit 48 may include a circular buffer for storing fetch address and instruction operation information corresponding to multiple lines of instruction operations which may be outstanding within processor 10. Upon retirement of a line of instructions, PC silo and redirect unit 48 may update branch history table 18 and indirect address cache 20 according to the execution of a conditional branch and an indirect branch, respectively. Upon processing an exception, PC silo and redirect unit 48 may purge entries from return stack 22 which are subsequent to the exception-causing instruction. Additionally, PC silo and redirect unit 48 routes an indication of the exception-causing instruction to map unit 30, instruction queues 36, and load/store unit 42 so that these units may cancel instructions which are subsequent to the exception-causing instruction and recover speculative state accordingly.

In one embodiment, PC silo and redirect unit 48 assigns a sequence number (R#) to each instruction operation to identify the order of instruction operations outstanding within processor 10. PC silo and redirect unit 48 may assign R#s to each possible instruction operation with a line. If a line includes fewer than the maximum number of instruction operations, some of the assigned R#s will not be used for that line. However, PC silo and redirect unit 48 may be configured to assign the next set of R#s to the next line of instruction operations, and hence the assigned but not used R#s remain unused until the corresponding line of instruction operations is retired. In this fashion, a portion of the R#s assigned to a given line may be used to identify the line within processor 10. In one embodiment, a maximum of 8

ROPs may be allocated to a line. Accordingly, the first ROP within each line may be assigned an R# which is a multiple of 8. Unused R#s are accordingly automatically skipped.

The preceding discussion has described line predictor 12 predicting next addresses and providing instruction operation information for lines of instruction operations. This operation occurs as long as each fetch address hits in line predictor 12. Upon detecting a miss in line predictor 12, alignment unit 16 routes the corresponding instruction bytes from I-cache 14 to predictor miss decode unit 26. Predictor miss decode unit 26 decodes the instructions beginning at the offset specified by the missing fetch address and generates a line of instruction operation information and a next fetch address. Predictor miss decode unit 26 enforces any limits on a line of instruction operations as processor 10 is designed for (e.g. maximum number of instruction operations, maximum number of instructions, terminate on branch instructions, etc.). Upon completing decode of a line, predictor miss decode unit 26 provides the information to line predictor 12 for storage. It is noted that predictor miss decode unit 26 may be configured to dispatch instructions as they are decoded. Alternatively, predictor miss decode unit 26 may decode the line of instruction information and provide it to line predictor 12 for storage. Subsequently, the missing fetch address may be reattempted in line predictor 12 and a hit may be detected. Furthermore, a hit in line predictor 12 may be detected and a miss in I-cache 14 may occur. The corresponding instruction bytes may be fetched through external interface unit 46 and stored in I-cache 14.

In one embodiment, line predictor 12 and I-cache 14 employ physical addressing. However, upon detecting an exception, PC silo and redirect unit 48 will be supplied a logical (or virtual) address. Accordingly, the redirect addresses are translated by ITB 50 for presentation to line predictor 12. Additionally, PC silo and redirect unit 48 maintains a virtual lookahead PC value for use in PC relative calculations such as relative branch target addresses. The virtual lookahead PC corresponding to each line is translated by ITB 50 to verify that the corresponding physical address matches the physical fetch address produced by line predictor 12. If a mismatch occurs, line predictor 12 is updated with the correct physical address and the correct instructions are fetched. PC silo and redirect unit 48 further handles exceptions related to fetching beyond protection boundaries, etc. PC silo and redirect unit 48 also maintains a retire PC value indicating the address of the most recently retired instructions.

Decode unit 24 is configured to receive instruction operations from alignment unit 16 in a plurality of issue positions, as described above. Decode unit 24 decodes the instruction bytes aligned to each issue position in parallel (along with an indication of which instruction operation corresponding to the instruction bytes is to be generated in a particular issue position). Decode unit 24 identifies source and destination operands for each instruction operation and generates the instruction operation encoding used by execution cores 40A–40B. Decode unit 24 is also configured to fetch microcode routines from microcode unit 28 for instructions which are implemented in microcode.

According to one particular embodiment, the following instruction operations are supported by processor 10: integer, floating point add (including multimedia), floating point multiply (including multimedia), branch, load, store address generation, and store data. Each instruction operation may employ up to 2 source register operands and one destination register operand. According to one particular embodiment, a single destination register operand may be assigned to integer ROPs to store both the integer result and a condition code (or flags) update. The corresponding logical registers will both receive the corresponding PR# upon retirement of the integer operation. Certain instructions may generate two instruction operations of the same type to update two destination registers (e.g. POP, which updates the ESP and the specified destination register).

The decoded instruction operations and source and destination register numbers are provided to map unit 30. Map unit 30 is configured to perform register renaming by assigning physical register numbers (PR#s) to each destination register operand and source register operand of each instruction operation. The physical register numbers identify registers within register files 38A–38B. Additionally, map unit 30 assigns a queue number (IQ#) to each instruction operation, identifying the location within instruction queues 36A–36B assigned to store the instruction operation. Map unit 30 additionally provides an indication of the dependencies for each instruction operation by providing queue numbers of the instructions which update each physical register number assigned to a source operand of the instruction operation. Map unit 30 updates map silo 32 with the physical register numbers and instruction to numbers assigned to each instruction operation (as well as the corresponding logical register numbers). Furthermore, map silo 32 may be configured to store a lookahead state corresponding to the logical registers prior to the line of instructions and an R# identifying the line of instructions with respect to the PC silo. Similar to the PC silo described above, map silo 32 may comprise a circular buffer of entries. Each entry may be configured to store the information corresponding one line of instruction operations.

Map unit 30 and map silo 32 are further configured to receive a retire indication from PC silo 48. Upon retiring a line of instruction operations, map silo 32 conveys the destination physical register numbers assigned to the line and corresponding logical register numbers to architectural renames block 34 for storage. Architectural renames block 34 stores a physical register number corresponding to each logical register, representing the committed register state for each logical register. The physical register numbers displaced from architectural renames block 34 upon update of the corresponding logical register with a new physical register number are returned to the free list of physical register numbers for allocation to subsequent instructions. In one embodiment, prior to returning a physical register number to the free list, the physical register numbers are compared to the remaining physical register numbers within architectural renames block 34. If a physical register number is still represented within architectural renames block 34 after being displaced, the physical register number is not added to the free list. Such an embodiment may be employed in cases in which the same physical register number is used to store more than one result of an instruction. For example, an embodiment employing the x86 instruction set architecture may provide physical registers large enough to store floating point operands. In this manner, any physical register may be used to store any type of operand. However, integer operands and condition code operands do not fully utilize the space within a given physical register. In such an embodiment, processor 10 may assign a single physical register to store both integer result and a condition code result of an instruction. A subsequent retirement of an instruction which overwrites the condition code result corresponding to the physical register may not update the same integer register, and hence the physical register may not be free upon committing a new condition code result. Similarly, a subsequent retirement of an instruction which updates the integer register corresponding to the physical register may not update the condition code register, and hence the physical register may not be free upon committing the new integer result.

Still further, map unit 30 and map silo 32 are configured to receive exception indications from PC silo 48. Lines of instruction operations subsequent to the line including the exception-causing instruction operation are marked invalid within map silo 32. The physical register numbers corresponding to the subsequent lines of instruction operations are freed upon selection of the corresponding lines for retirement (and architectural renames block 34 is not updated with the invalidated destination registers). Additionally, the lookahead register state maintained by map unit 30 is restored to the lookahead register state corresponding to the exception-causing instruction.

The line of instruction operations, source physical register numbers, source queue numbers, and destination physical register numbers are stored into instruction queues 36A–36B according to the queue numbers assigned by map unit 30. According to one embodiment, instruction queues 36A–36B are symmetrical and can store any instructions. Furthermore, dependencies for a particular instruction operation may occur with respect to other instruction operations which are stored in either instruction queue. Map unit 30 may, for example, store a line of instruction operations into one of instruction queues 36A–36B and store a following line of instruction operations into the other one of instruction queues 36A–36B. An instruction operation remains in instruction queues 36A–36B at least until the instruction operation is scheduled. In one embodiment, instruction operations remain in instruction queues 36A–36B until retired.

Instruction queues 36A–36B, upon scheduling a particular instruction operation for execution, determine at which clock cycle that particular instruction operation will update register files 38A–38B. Different execution units within execution cores 40A–40B may employ different numbers of pipeline stages (and hence different latencies). Furthermore, certain instructions may experience more latency within a pipeline than others. Accordingly, a countdown is generated which measures the latency for the particular instruction operation (in numbers of clock cycles). Instruction queues 36A–36B await the specified number of clock cycles (until the update will occur prior to or coincident with the dependent instruction operations reading the register file), and then indicate that instruction operations dependent upon that particular instruction operation may be scheduled. For example, in one particular embodiment dependent instruction operations may be scheduled two clock cycles prior to the instruction operation upon which they depend updating register files 38A–38B. Other embodiments may schedule dependent instruction operations at different numbers of clock cycles prior to or subsequent to the instruction operation upon which they depend completing and updating register files 38A–38B. Each instruction queue 36A–36B maintains the countdowns for instruction operations within that instruction queue, and internally allow dependent instruction operations to be scheduled upon expiration of the countdown. Additionally, the instruction queue provides indications to the other instruction queue upon expiration of the countdown. Subsequently, the other instruction queue may schedule dependent instruction operations. This delayed transmission of instruction operation completions to the other instruction queue allows register files 38A–38B to propagate results provided by one of execution cores 40A–40B to the other register file. Each of register files 38A–38B implements the set of physical registers employed by processor 10, and is updated by one of execution cores 40A–40B. The updates are then propagated to the other register file. It is noted that instruction queues 36A–36B may schedule an instruction once its dependencies have been satisfied (i.e. out of order with respect to its order within the queue).

Instruction operations scheduled from instruction queue 36A read source operands according to the source physical register numbers from register file 38A and are conveyed to execution core 40A for execution. Execution core 40A executes the instruction operation and updates the physical register assigned to the destination within register file 38A. Some instruction operations do not have destination registers, and execution core 40A does not update a destination physical register in this case. Additionally, execution core 40A reports the R# of the instruction operation and exception information regarding the instruction operation (if any) to PC silo and redirect unit 48. Instruction queue 36B, register file 38B, and execution core 40B may operate in a similar fashion.

In one embodiment, execution core 40A and execution core 40B are symmetrical. Each execution core 40 may include, for example, a floating point add unit, a floating point multiply unit, two integer, units a branch unit, a load address generation unit, a store address generation unit, and a store data unit. Other configurations of execution units are possible.

Among the instruction operations which do not have destination registers are store address generations, store data operations, and branch operations. The store address/store data operations provide results to load/store unit 42. Load/store unit 42 provides an interface to D-cache 44 for performing memory data operations. Execution cores 40A–40B execute load ROPs and store address ROPs to generate load and store addresses, respectively, based upon the address operands of the instructions. More particularly, load addresses and store addresses may be presented to D-cache 44 upon generation thereof by execution cores 40A–40B (directly via connections between execution cores 40A–40B and D-Cache 44). Load addresses which hit D-cache 44 result in data being routed from D-cache 44 to register files 38. On the other hand, store addresses which hit are allocated a store queue entry. Subsequently, the store data is provided by a store data instruction operation (which is used to route the store data from register files 38A–38B to load/store unit 42). Upon retirement of the store instruction, the data is stored into D-cache 44. Additionally, load/store unit 42 may include a load/store buffer for storing load/store addresses which miss D-cache 44 for subsequent cache fills (via external interface 46) and re-attempting the missing load/store operations. Load/store unit 42 is further configured to handle load/store memory dependencies.

Figure 2:
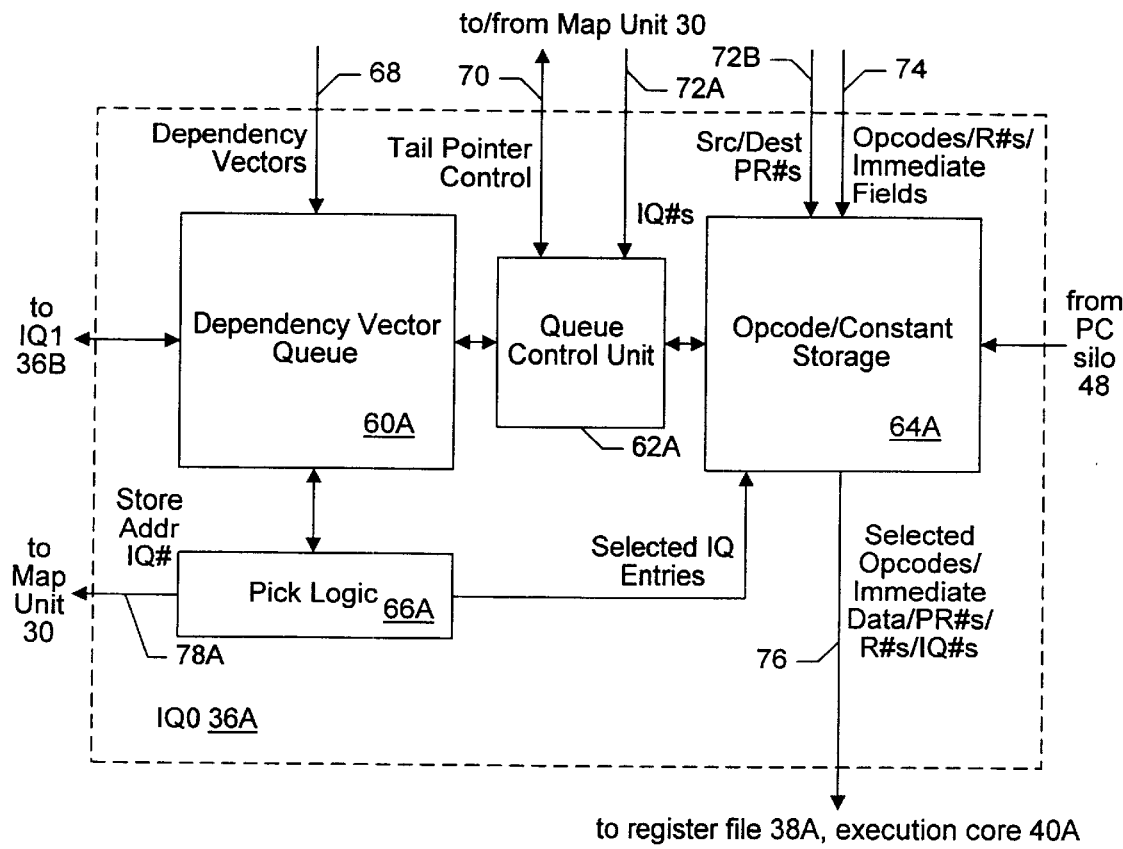
FIG. 2 is a block diagram of one embodiment of an instruction queue shown in FIG. 1.

Turning now to FIG. 2, a block diagram illustrating one embodiment of instruction queue 36A is shown. Instruction queue 36B may be configured similarly. Other embodiments are possible and contemplated. In the embodiment of FIG. 2, instruction queue 36A includes a dependency vector queue 60A, a queue control unit 62A, an opcode/constant storage 64A, and a pick logic 66A. Dependency vector queue 60A is connected to a dependency vectors bus 68 from map unit 30, and to queue control unit 62A, pick logic 66A, and instruction queue 36B. Queue control unit 62A is connected to a tail pointer control bus 70 from map unit 30, an IQ#s bus 72A from map unit 30, and opcode/constant storage 64A. Opcode/constant storage 64A is connected to pick logic 66A, a source/destination PR#s bus 72B from map unit 30, an opcodes/R#s/immediate fields bus 74 from map unit 30, and PC silo 48. Opcode/constant storage 64A is further connected to a bus 76 upon which selected opcodes, immediate data, PR#s, R#s, and IQ#s may be conveyed to register file 38A and execution core 40A. Pick logic 66A is connected to a store address IQ# bus 78A.

Generally, an ROP is allocated an entry in dependency vector queue 60A and opcode/constant storage 64A corresponding to the IQ# assigned to that ROP by map unit 30. In other words, the IQ# identifies the entry within dependency vector-queue 60A and opcode/constant storage 64A into which the information corresponding to the ROP is stored. The assigned IQ#s are provided to instruction queue 36A upon IQ#s bus 72A. Queue control unit 62A receives the assigned IQ#s and asserts corresponding write enable signals to cause dependency vector queue 60A and opcode/constant storage 64A to store the received information in the assigned entry.

Dependency vector queue 60A stores a dependency vector corresponding to-each ROP represented within instruction queue 36A. Generally, a "dependency vector" records each dependency noted for the corresponding ROP. The dependencies may be operand dependencies or ordering dependencies. One embodiment of a dependency vector is illustrated below, although other embodiments may employ different dependency vectors. An ROP is ineligible for scheduling until each of the dependencies recorded in the corresponding dependency vector are satisfied. Once each of the dependencies is satisfied, a scheduling request signal on a scheduling request line corresponding to the entry is asserted by dependency vector queue 60A to pick logic 66A, which schedules ROPs within instruction queue 36A for execution. The dependency vectors corresponding to a line of ROPs received by instruction queue 36A are conveyed to dependency vector queue 60A upon dependency vectors bus 68.

Opcode/constant storage 64A stores instruction information other than the dependency information used to schedule the ROPs. For example, the opcode and any immediate data specified by the ROP are stored in opcode/constant storage 64A. Additionally, the R# assigned by PC silo 48 to the ROP is stored in opcode/constant storage 64A. The opcodes, immediate data, and R#s corresponding to a line of ROPs are received upon opcodes/R#s/immediate fields bus 74 from map unit 30. Still further, the source and destination PR#s assigned to the ROP by map unit 30 are stored in opcode/constant storage 64A. The source and destination PR#s corresponding to a line of ROPs are received upon source/destination PR#s bus 72B from map unit 30. Opcode/constant storage 64A may comprise a random access memory (RAM), for example. Alternatively, a variety of other storages may be used (e.g. a set of registers or other clocked storage devices).

Pick logic 66A transmits the IQ#s of the ROPs scheduled for execution to opcode/constant storage 64A. Opcode/constant storage 64A reads the entries specified by the selected IQ#s and provides the opcodes, immediate data, PR#s, R#s, and IQ#s of the corresponding ROPs upon bus 76 to execution core 40A and register file 38A. Register file 38A receives the source PR#s to read the source operands. Execution core 40A receives the remaining information to execute the ROP. Pick logic 66A is configured to schedule up to one instruction operation per clock cycle for each execution unit within execution core 40A.

In one embodiment, map unit 30 assigns the execution unit within execution core 40A in which a given ROP is to be executed. Certain ROPs may only be executed by one of the execution units, and hence are assigned to that execution unit. Other ROPs may be executed by multiple execution units, and may be divided as evenly as possible among the multiple execution units. For example, in one embodiment, two integer execution units are included in execution core 40A. Map unit 30 may assign integer ROPs within a line of ROPs alternately to the two integer execution units. Pick logic 66A schedules each ROP to the assigned execution unit once that ROP's dependencies are satisfied. In one particular embodiment, pick logic 66A receives the assigned execution units for a line of ROPs concurrent with the line of ROPs being received by dependency vector queue 60A and opcode/constant storage 64A. Alternatively, the assigned execution unit may be stored in dependency vector queue 60A or opcode/constant storage 64A and conveyed to pick logic 66A for use in scheduling.

Pick logic 66A may additionally include the aforementioned countdown circuitry to determine the clock cycle in which a scheduled ROP may be considered satisfied in regard to the dependent ROPs within instruction queues 36A–36B. In the present embodiment, a dependency is satisfied somewhat before completion of the ROP upon which the dependency is noted. Particularly, one or more pipeline stages may exist between scheduling an ROP from instruction queues 36A–36B and that ROP reading register files 36A–36B (e.g. 2 stages in one particular embodiment). Other embodiments may have more or fewer stages, including no stages (i.e. the countdown expires upon update of register files 36A–36B). Upon expiration of the countdown, a write valid signal on a write valid line is asserted by pick logic 66A corresponding to the entry within instruction queue 36A assigned to the completing ROP. The write valid signal remains asserted until the corresponding queue entry is allocated to another ROP. The write valid signal is used by dependency vector queue 60A to recognize that a corresponding dependency has been satisfied. In other words, each ROP which has a dependency recorded for the completed ROP may recognize that dependency as satisfied. If each other recorded dependency is satisfied, dependency queue 60A may assert the scheduling request signal on the scheduling request line corresponding to that ROP to pick logic 66A to request scheduling.

Each clock cycle, each entry within dependency vector queue 60A evaluates the stored dependency vector to determine if the dependencies have been satisfied. If the recorded dependencies have been satisfied, the corresponding scheduling request signal on the corresponding scheduling request line is asserted. As used herein, "evaluating" a dependency vector refers to examining the dependencies recorded in the dependency vector, in conjunction with the write valid signals indicating which ROPs have been completed, to determine which dependency vectors record only satisfied dependencies. The ROPs corresponding to the dependency vectors which record only satisfied dependencies are eligible for execution and assert a scheduling request signal to pick logic 66A.

In the present embodiment, ROPs may have up to two source operands and may therefore have up to two source operand dependencies noted in the corresponding dependency vector. Furthermore, several ordering dependencies are defined in the present embodiment for load ROPs. First, load ROPs are order dependent on each previous store address ROP. This dependency is imposed to simplify the dependency checking logic employed by load/store unit 42. If addresses of previous stores are not available upon execution of a load ROP, then logic to detect that a dependency on one of those previous stores (determined by comparing the address of the store to the address of the load) must somehow be capable of recognizing the dependency at a later time and correctly handling the dependency. On the other hand, by enforcing an ordering dependency for each prior store address ROP, the store addresses are available and dependency checking may be completed upon execution of the load ROP. Additionally, load ROPs may experience ordering dependencies upon earlier store data ROPs if a dependency upon a particular store is predicted via a store/load forward mechanism described below. Other types of ordering dependencies may be employed as desired. For example, certain instructions are synchronizing instructions (i.e. each instruction prior to the synchronizing instruction is completed prior to executing the synchronizing instruction and each instruction subsequent to the synchronizing instruction is not executed prior to execution of the synchronizing instruction). Synchronizing instructions may be accomplished by noting an ordering dependency for the synchronizing instruction upon each prior ROP and noting an ordering dependency upon the synchronizing instruction for each subsequent ROP.

In order to record store address ROP ordering dependencies for load ROPs, map unit 30 maintains a store address dependency vector (described below). The store address dependency vector records each outstanding store address ROP for inclusion in the dependency vector for subsequent load ROPs. Accordingly, upon determining that a store address ROP is successfully completed, pick logic 66A transmits the IQ# of the store address ROP to map unit 30 upon store address IQ# bus 78A.

Figure 4:
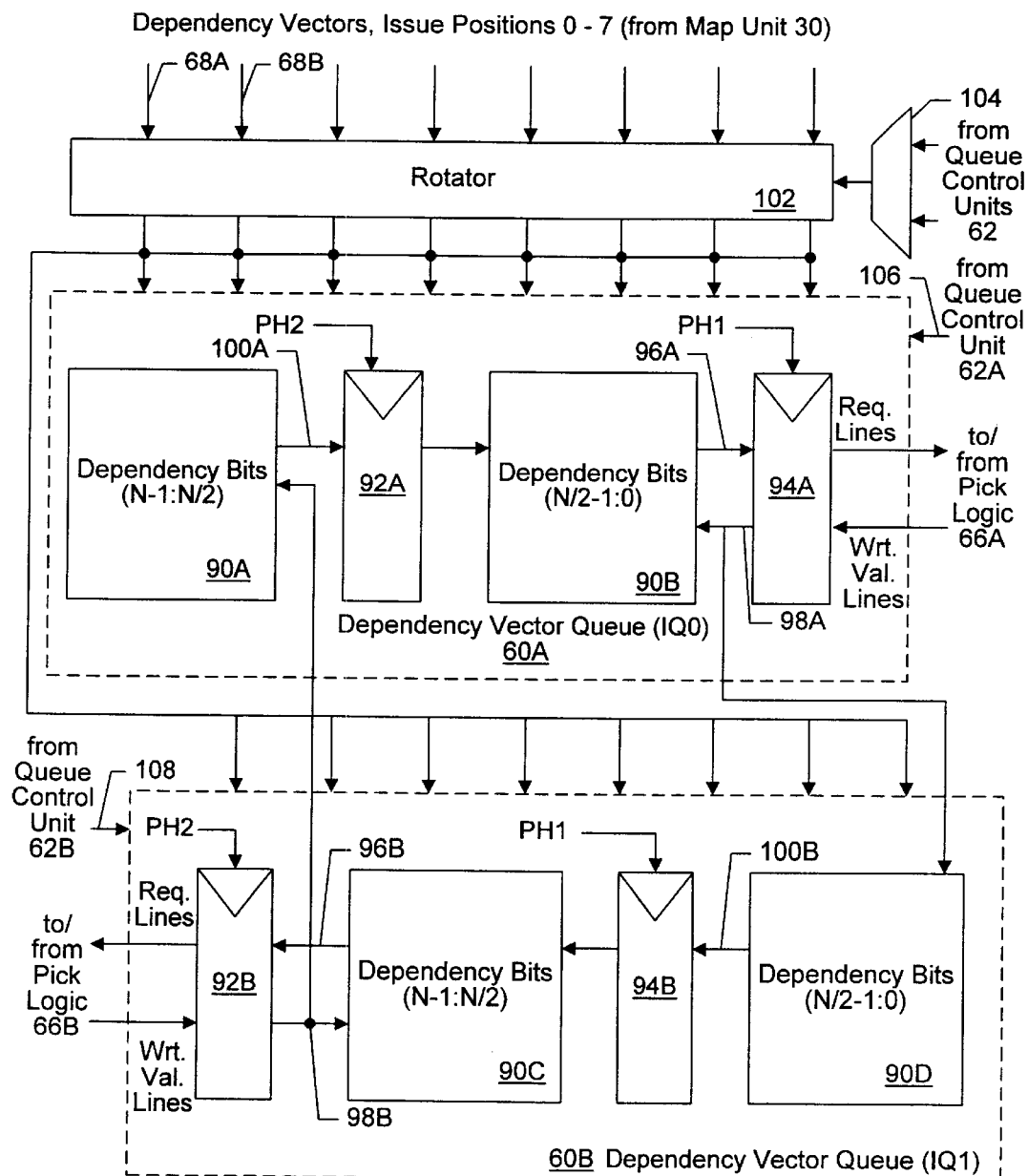
FIG. 4 is a block diagram of one embodiment of a pair of dependency vector queues.

As illustrated in FIG. 2, the present embodiment of dependency vector queue 60A is connected to instruction queue 36B (and more particularly to a similar dependency vector queue as illustrated in FIG. 4 below). Dependency vector queue 60A routes the write valid lines provided by pick logic 66A to the corresponding dependency vector queue within instruction queue 366B and receives write valid lines corresponding to ROPs stored in instruction queue 36B. Logically, instruction queues 36A–36B may be viewed as a single instruction queue having a number of entries equal to the sum of the entries within instruction queue 36A and the entries within instruction queue 36B. One half of the IQ#s identify entries within instruction queue 36A and the other half of the IQ#s identify entries within instruction queue 36B. For example, the most significant bit of the IQ# may identify an entry as being within instruction queue 36A or instruction queue 36B.

A dependency may exist between an ROP in one of instruction queues 36A–36B and an ROP within the other instruction queue. Accordingly, the dependency vectors may record dependencies corresponding to ROPs from either instruction queue. The write valid lines corresponding to either instruction queue are routed to each dependency vector queue for use in evaluating the dependency vectors stored therein.

Queue control unit 62A communicates with map unit 30 via tail pointer control bus 70. Generally, queue control unit 62A is configured to maintain head and tail pointers indicating the first valid instruction within instruction queue 36A (in program order) and the last valid instruction within instruction queue 36A (in program order), respectively. Queue control unit 62A conveys the current tail pointer to map unit 30 upon tail pointer control bus 70. If map unit 30 assigns queue entries within instruction queue 36A, map unit 30 returns the number of queue entries assigned via tail pointer control bus 70 such that queue control unit 36A may update the tail pointer. Queue control unit 36A may further transmit a queue full signal if there is insufficient space between the tail pointer and the head pointer for a line of ROPs. It is noted that, in the present embodiment, ROPs may be assigned an IQ# a number of pipeline stages prior to being stored into instruction queue 36A. Accordingly, the assigned IQ#s may be pipelined with the ROPs to instruction queue 36A. Upon assigning the IQ#s in map unit 30 and updating the tail pointer, map unit 30 and instruction queue 36A effectively reserve queue entries for ROPs in the pipeline.

PC silo 48 is configured to convey an R# of an ROP which experiences an exception to various pipeline stages within processor 10 for cancellation of subsequent instructions. Accordingly, opcode/constant storage 64A may receive the exception R# from PC silo 48. Opcode/constant storage 64A compares the exception R# to the R#s stored therein. Opcode/constant storage 64A may indicate to queue control unit 62A which entries store R#s indicating that the corresponding ROP is subsequent to the ROP experiencing the exception. The indicated entries may then be invalidated and the tail pointer reset to delete the indicated entries from the queue.

Figure 3:
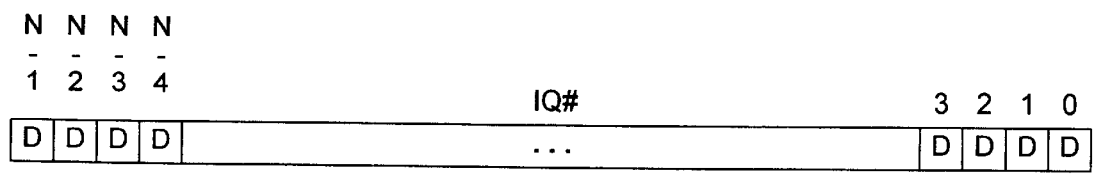
FIG. 3 is a block diagram one embodiment of a dependency vector.

Turning now to FIG. 3, a block diagram of one embodiment of a dependency vector 80 is shown. Other embodiments are possible and contemplated. As shown in FIG. 3, dependency vector 80 includes an indication corresponding to each IQ# (0 through N–1, where the total number of entries within instruction queues 36A–36B is N). In one particular embodiment, N may be 128 although any suitable number may be employed. The indication corresponding to each IQ# records whether or not a dependency exists for the ROP corresponding to dependency vector 80 upon the ROP assigned the corresponding IQ#. Accordingly, dependency vector 80 may record an arbitrary number of dependencies for the corresponding ROP (up to a dependency upon each other outstanding ROP). In one particular embodiment, each indication comprises a bit, indicative, when set, of a dependency upon the ROP assigned the corresponding IQ# and indicative, when clear, of a lack of dependency upon the ROP assigned the corresponding IQ#.

Dependency vector 80 may advantageously provide a universal mechanism for scheduling ROPs. Since dependency vector 80 is configured to record an arbitrary number of dependencies, a given ROP can be ordered with respect to any other ROP. Accordingly, any architectural or microarchitectural restrictions upon concurrent execution or upon order of particular ROPs in execution may be enforced. If, during the development of a processor implementation, it becomes desirable to add additional execution order restrictions (e.g. to simplify the implementation), the additional restrictions may be accommodated by indicating ordering dependencies within dependency vector 80. The enhanced flexibility may improve the suitability of instruction queues 36A–36B for a variety of processor implementations.

Turning next to FIG. 4, a block diagram illustrating one embodiment of dependency vector queue 60A and a dependency vector queue 60B from instruction queue 36B is shown. Other embodiments are possible and contemplated. In the embodiment of FIG. 4, dependency vector queue 60A includes a first storage 90A and a second storage 90B, as well as a PH2 latch 92A and a PH1 latch 94A. Similarly, dependency vector queue 60B includes a first storage 90C and a second storage 90D, as well as a PH2 latch 92B and a PH1 latch 94B. First storage 90A is connected to PH2 latch 92A, which is further connected to second storage 90B. Second storage 90B is in turn connected to PH1 latch 94A, which is connected to pick logic 66A (shown in FIG. 2). Similarly, second storage 90D is connected to PH1 latch 94B, which is further connected to first storage 90C. First storage 90C is in turn connected to PH2 latch 92B.

More particularly, PH1 latch 94A is connected to a set of scheduling request lines 96A and a set of write valid lines 98A. Scheduling request lines 96A are propagated through PH1 latch 94A from second storage 90B, while write valid lines 98A are propagated through PH1 latch 94A to second storage 90B and second storage 90D. A set of intermediate scheduling request lines 100A are propagated through PH2 latch 92A from first storage 90A to second storage 90B. A set of scheduling request lines 96B and a set of write valid lines 98B are similarly propagated through PH2 latch 92B to pick logic 66B and to first storage 90C, respectively. Write valid lines 98B are similarly propagated to first storage 90A. A set of intermediate scheduling request signals on intermediate scheduling request lines 100B are generated by second storage 90D and propagated through PH1 latch 94B to first storage 90C. Each PH2 latch 92A–92B receives a PH2 clock input, while each PH1 latch 94A–94B receives a PH1 clock input. Dependency vector queues 60A and 60B are connected to a rotator 102 which is further connected to dependency vector buses 68 from map unit 30 (e.g. dependency vector bus 68A providing the dependency vector for issue position 0, dependency vector bus 68B providing the dependency vector for issue position 1, etc.). Rotator 102 is connected to receive a rotation control from a multiplexor (mux) 104, which receives input from queue control units 62. Furthermore, dependency vector queue 60A receives a set of write enables 106 from queue control unit 62A and dependency vector queue 60B similarly receives a set of write enables 108 from queue control unit 62B.

Dependency vector queues 60A and 60B as shown in FIG. 4 employ several features which may enhance the clock frequency at which instruction queues 36A–36B may operate. Due to the relatively large number of instruction queue entries which may be supported (e.g. 128 in one embodiment), dependency vector evaluation is divided into portions and performed during consecutive clock phases. The first portion of the dependency vector is evaluated during the first phase, producing the intermediate scheduling request signals upon, e.g., intermediate scheduling request lines 100A in dependency vector queue 60A. During the succeeding clock phase, the second portion of the dependency vector is evaluated (along with the intermediate scheduling request signals) to produce the scheduling request signals to pick logic 66A. For example, in one embodiment the intermediate scheduling request lines and scheduling request lines are wire ORed lines which are precharged to a high state (indicating no dependency) and are discharged if one or more dependencies within the corresponding portion of the dependency vector remain unsatisfied. Accordingly, by performing the evaluation in portions, the load on the wire OR lines is decreased and hence discharge of the wire OR lines may proceed more rapidly in response to a dependency. Advantageously, overall clock frequency may be increased. Another feature which may improve the frequency of operation is the division of a single logical instruction queue into instruction queues 36A–36B. The pick logic for each queue may be less complex and therefore may operate more rapidly to schedule instructions since the pick logic considers only a portion of the instructions actually in the single logical instruction queue. Furthermore, the instruction queues may schedule instructions during different clock phases, thereby allowing the satisfaction of a dependency on an ROP in the opposite instruction queue to propagate to the instruction queue in ½ clock cycle (as opposed to a full clock cycle). This ½ clock cycle of propagation may also be used to move data from the opposite register file to the register file corresponding to the scheduling instruction queue.

As used herein, the "phase" of a clock signal refers to a portion of the period of the clock signal. Each phase is delimited by the rise and fall of a clock signal corresponding to that phase. Generally, a clocked storage device (such as a latch, register, flip-flop, etc.) captures a value at the termination of one of the phases. Additionally, the phases typically do not overlap. In the embodiment of FIG. 4, the clock period is divided into two phases (PH1 and PH2), each of which is represented by a clock signal. PH1 latches 94A–94B capture values at the end of the PH1 phase, while PH2 latches 92A–92B capture values at the end of the PH2 phase.

Generally, first storage 90A stores, for each dependency vector corresponding to an ROP within instruction queue 36A, the portion of the dependency vector which corresponds to IQ#s N−1 down to N/2. Similarly, first storage 90C stores, for each dependency vector corresponding to an ROP within instruction queue 36B, the portion of the dependency vector which corresponds to IQ#s N−1 down to N/2. Second storage 90B stores, for each dependency vector corresponding to an ROP within instruction queue 36A, the portion of the dependency vector which corresponds to IQ#s N/2−1 down to 0. Accordingly, first storage 90A and first storage 90C store the portions of each dependency vector which correspond to the entries in instruction queue 36B, while second storage 90B and second storage 90C store the portions of each dependency vector which correspond to the entries in instruction queue 36A.

The operation of dependency vector queue 60A as shown in FIG. 4 will now be described. During the PH2 phase, first storage 90A evaluates the portion of each dependency vector stored therein (the "first portion"), generating the intermediate scheduling request signals on intermediate scheduling request lines 100A. An intermediate scheduling request line is included for each entry within dependency vector queue 60A. The intermediate scheduling request signal is asserted if each dependency recorded in the first portion of the corresponding dependency vector is satisfied, and is deasserted if at least one dependency recorded in the first portion is not satisfied. In one embodiment, as mentioned above, intermediate scheduling request lines 100A are wire ORed. The intermediate scheduling request lines are precharged to an asserted state (during the PH1 phase for first storage 90A) and then discharged to the deasserted state (during the PH2 phase for first storage 90A) if one or more dependencies remain unsatisfied. PH2 latch 92A captures the set of intermediate scheduling request signals on intermediate scheduling request lines 100A and propagates them to second storage 90B during the PH1 phase.

Second storage 90B, similar to first storage 90A, evaluates the second portion of the dependency vector, generating a set of scheduling request signals on scheduling request lines 96A. In addition to evaluating the dependencies in the second portion of each dependency vector to generate the set of scheduling request signals, the corresponding intermediate scheduling request signals are included in the evaluation. If the corresponding intermediate scheduling request signal is asserted and each of the dependencies recorded in the second portion of the dependency vector have been satisfied, then the scheduling request signal is asserted. If the corresponding intermediate scheduling request signal is deasserted or one or more of the dependencies recorded in the second portion of the dependency vector are not satisfied, then the scheduling request signal is deasserted. PH1 latch 94A captures the scheduling request signals and propagates the scheduling request signals to pick logic 66A.

Pick logic 66A provides write valid signals to PH1 latch 94A. A write valid signal is provided for each queue entry within instruction queue 36A, indicating the dependency upon the corresponding ROP is satisfied. In other words, an asserted write valid signal, is an indication that a dependency upon the corresponding ROP has been satisfied. Accordingly, the write valid signals from pick logic 66A are propagated to second storage 90B and second storage 90D. Similarly, write valid signals from pick logic 66B are routed to first storage 90A and first storage 90C.

Dependency vector queue 60B evaluates dependency vectors in a manner similar to dependency vector queue 60A. However, second storage 90D evaluates the second portion of the dependency vector to produce intermediate scheduling request signals during the PH1 phase, followed by an evaluation within first storage 90C of the first portion of the dependency vector and the intermediate scheduling request signals to produce scheduling request signals during the PH2 phase.

In order to reduce the number of transistors forming dependency vector queues 36A–36B, it may be desirable to provide one write line to each entry (i.e. one line for transporting data into the entry). Generally, the first ROP provided by map unit 30 (in issue position 0, with the corresponding dependency vector on dependency vector bus 68A) may be assigned to any queue entry based upon the tail pointer of the queue at the time of allocation. Subsequent ROPs are assigned the next consecutive queue entries up to the last ROP provided (which may be fewer than the maximum number of eight). Accordingly, rotator 102 is provided. Each output of the rotator is connected to one set of queue entries, where each entry in the set is spaced from the neighboring entries within the set by a number of entries equal to the number of issue positions. For example, in the present embodiment employing eight issue positions, the first output may be connected to entries 0, 8, 16, etc. The second output may be connected to entries 1, 9, 17, etc. In order for the dependency vectors to be provided on write input lines to the assigned queue entry, rotator 102 rotates the dependency vectors provided on dependency vectors bus 68 according to the low order bits of the IQ# assigned to issue position zero. In the present embodiment employing eight issue positions, the low order three bits provide the rotation amount. For example, if IQ# 0, 8, or 16 is assigned to issue position 0, a rotation of zero positions is performed and the dependency vector corresponding to issue position zero is provided on the first output of the rotator. In the other hand, if IQ# 1, 9, or 17 is provided, a rotation of one issue position is performed and the dependency vector corresponding to issue position zero is provided on the second output of the rotator. Since the second output is connected to entries 1, 9, 17, etc., the dependency vector corresponding to issue position zero is provided upon the write lines connected to the assigned queue entry. The remaining dependency vectors are correspondingly provided upon the write lines connected to the assigned queue entries.

Rotator 102 is connected to receive the rotation amount from one of queue control units 62 depending upon which of instruction queues 36A–36B is receiving ROPs in the current clock cycle. Mux 104 alternately selects the rotation amount input (corresponding to the IQ# assigned to the ROP in issue position zero) from queue control unit 82A within instruction queue 36A and queue control unit 82B within instruction queue 36B. Additionally, queue control unit 82A or 82B (depending upon which instruction queue is receiving ROPs) asserts write enable signals corresponding to the assigned IQ#s, causing the assigned queue entries to store the provided dependency vectors.

Figure 5:
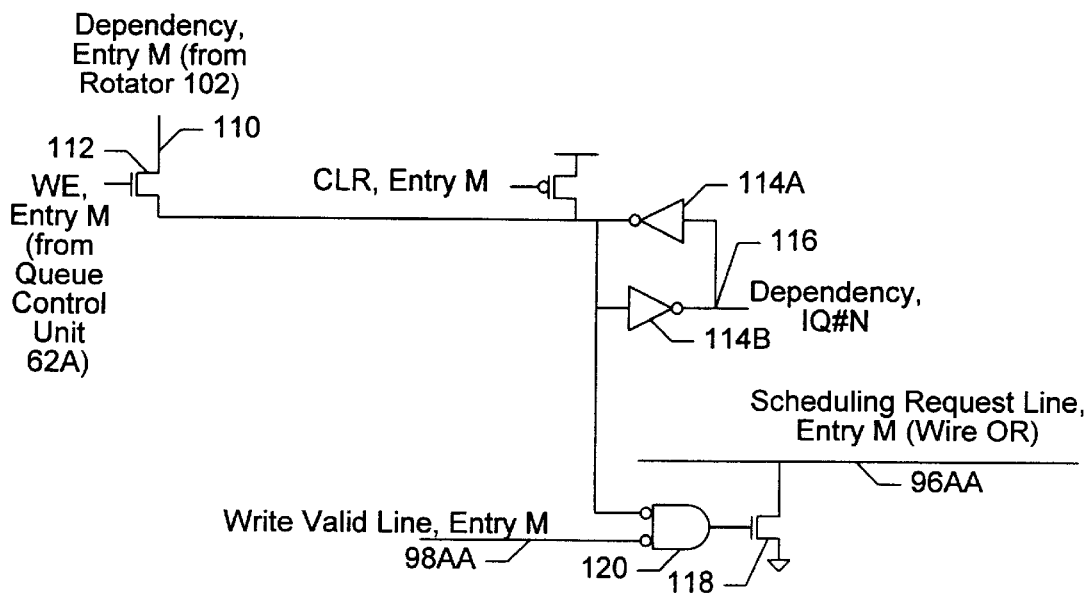
FIG. 5 is a circuit diagram of a portion of one embodiment of a dependency vector queue.

Turning now to FIG. 5, a circuit diagram illustrating a portion of one embodiment of a dependency vector queue entry (entry number M) within dependency vector queue 60A is shown. Other embodiments are possible and contemplated. The portion shown corresponds to one dependency indication within the dependency vector stored in entry M (e.g. an indication of a dependency on IQ# N).

The dependency indication for IQ#N is provided on a write line 110 from rotator 102. If the write enable signal on write enable line 112 is asserted by queue control unit 62A, the dependency indication is stored into the storage cell represented by cross coupled inverters 114A–114B. The dependency indication received upon write line 110 is the inverse of the actual dependency indication, such that a logical high on node 116 indicates that a dependency exists for the ROP in IQ #N.

Scheduling request line 96AA (one of scheduling request lines 96A illustrated in FIG. 4) is shown in FIG. 5 as well. A precharge transistor (not shown) precharges the wire OR line 96AA to an asserted state. A discharge transistor 118 is connected between scheduling request line 96AA and ground. If the output of a gate 120 connected to discharge transistor 118 is a logical one, discharge transistor 118 discharges scheduling request line 96AA and the ROP stored in IQ#M is not scheduled. On the other hand, if the output of gate 120 is a logical zero, discharge transistor 118 does not discharge scheduling request line 96AA. If other, similar discharge transistors corresponding to other dependency indications within the dependency vector do not discharge scheduling request line 96AA, the ROP stored in IQ#M may be scheduled.

Gate 120 is a NOR gate as shown in FIG. 5. Accordingly, if a dependency is not indicated in the storage cell represented by inverters 114A–114B, the input from the storage cell to gate 120 is a logical one and the output of gate 120 is a logical zero, preventing discharge transistor 118 from discharging scheduling request line 96AA to a deasserted state. In this manner, a lack of a dependency upon a given IQ# does not prevent scheduling of the ROP in IQ#M regardless of whether or not the ROP in IQ#N is completed. On the other hand, if a dependency is indicated in the storage cell, the input from the storage cell is a logical zero and the output of gate 120 will be a logical one until the write valid line 98AA (one of write valid lines 98A shown in FIG. 4) is asserted low. In the embodiment of FIG. 5, a dependency is indicated as satisfied via a logical low on a write valid line. Once the write valid line is asserted, the output of gate 120 switches to a logical zero and discharge transistor 118 is not activated.

Figure 6:
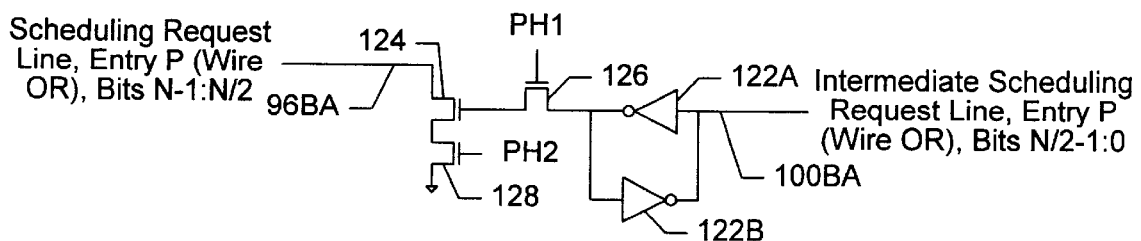
FIG. 6 is a circuit diagram of another portion of one embodiment of a dependency vector queue.

Turning next to FIG. 6, a circuit diagram illustrating one embodiment of the propagation of an intermediate scheduling request signal on intermediate scheduling request line 100BA (one of intermediate scheduling request lines 10013 shown in FIG. 4) from second storage 90D to a corresponding scheduling request line 96BA (one of scheduling request lines 96B shown in FIG. 4) in first storage 90C is shown. Other embodiments are possible and contemplated.

In the embodiment of FIG. 6, the intermediate scheduling request signal upon intermediate scheduling request line 100BA is captured in a storage cell represented by cross coupled inverters 122A–122B. An inverted version of the intermediate scheduling request signal is passed through a pass transistor 126, during the PH1 phase, to a transistor 124. At the end of the PH1 phase, the inversion of the intermediate scheduling request signal is present on the gate of transistor 124 and is isolated from the storage cell by transistor 126. At the start of the PH2 phase, transistor 128 is activated. If the gate of transistor 124 is a logical one (i.e. the intermediate request signal was deasserted upon capture at the end of the PH1 phase), scheduling request line 96BA is discharged to a deasserted state through transistors 124 and 128. On the other hand, if the gate of transistor 124 is a logical zero (i.e. the intermediate request line was asserted upon capture at the end of the PH1 phase), scheduling request line 96BA is not discharge through transistors 124 and 128. Scheduling request line 96BA may be deasserted according to evaluation of the first portion of the dependency vector, or may remain asserted to indicate that the ROP in entry P may be scheduled.

It is noted that inverters 122A–122B and transistors 124, 126, and 128 may comprise a portion of PH1 latch 94B. It is further noted that the above discussion refers to signals being asserted and deasserted. A signal may be defined to be asserted when in a logical one state and deasserted when in a logical zero state, or vice versa, as may be convenient. For example, in FIGS. 5 and 6, scheduling request lines are asserted in a logical one state while write valid lines are asserted in a logical zero state. Other embodiments may reverse the sense of any signal, as desired.

Figure 7:
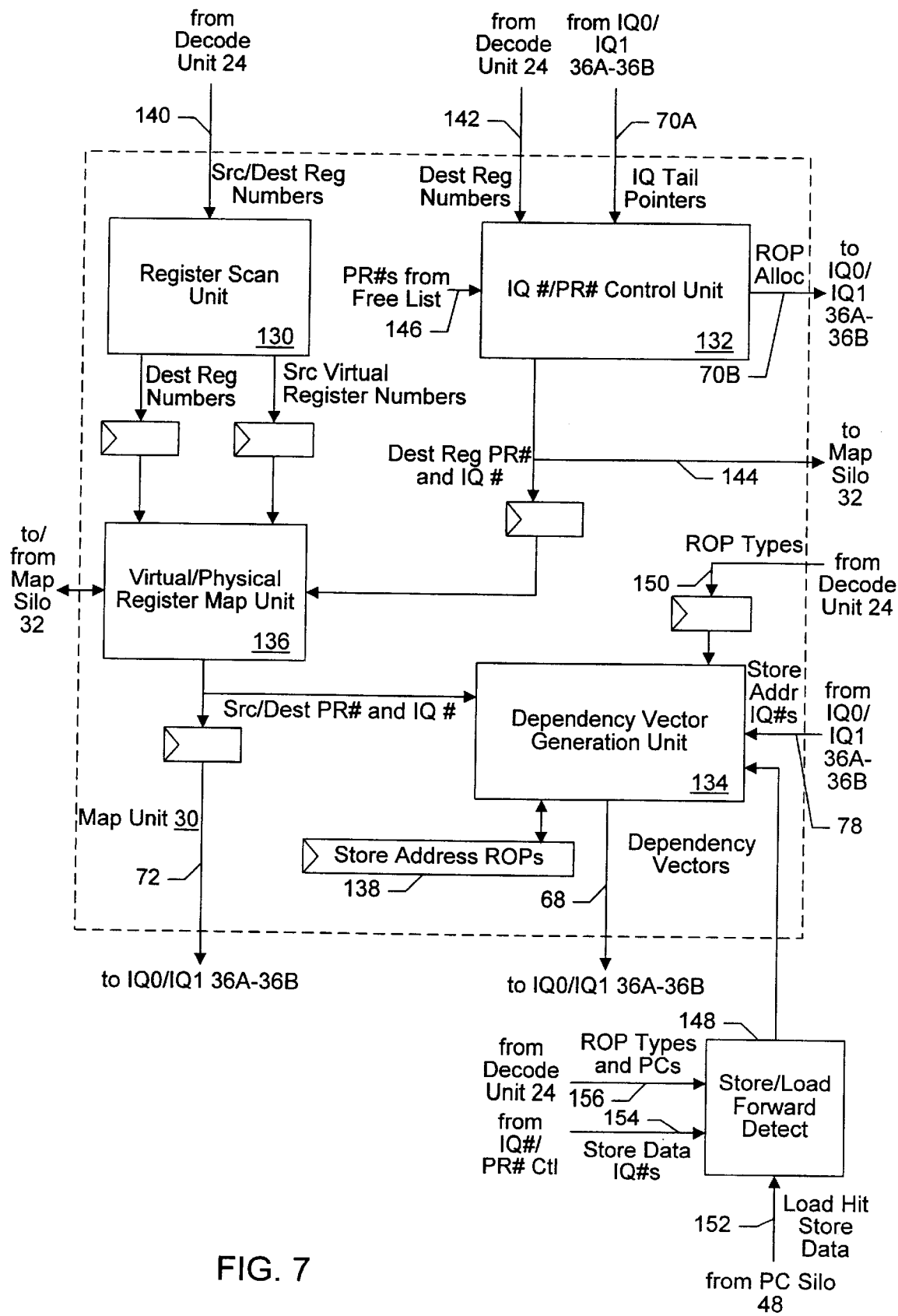
FIG. 7 is a block diagram of one embodiment of a map unit shown in FIG. 1 and one embodiment of a store/load forward detection unit.

Turning next to FIG. 7, a block diagram of one embodiment of map unit 30 and a store/load forward detect unit 148 is shown. Other embodiments are possible and contemplated. In the embodiment of FIG. 7, map unit 30 includes a register scan unit 130, an IQ#/PR# control unit 132, a virtual/physical register map unit 136, a dependency vector generation unit 134, and a store address register 138. Register scan unit 130 is connected to receive source and destination register numbers (and a valid indication for each) from decode unit 24 upon bus 140. Register scan unit 130 is configured to pass the destination register numbers and source virtual register numbers to virtual/physical register map unit 136. IQ#/PR# control unit 132 is connected to a bus 142 to receive destination register numbers and valid indications corresponding to the destination register numbers. Instruction queues 36A–36B provide tail pointers upon tail pointers bus 70A (a portion of tail pointer control bus 70 shown in FIG. 2), indicating which entry in each queue is currently the tail of the queue. IQ#/PR# control unit 132 is further connected to an ROP allocation bus 70B (a portion of tail pointer control bus 70 shown in FIG. 2). Additionally, IQ#/PR# control unit 132 is connected to a destination PR#/IQ# bus 144. Virtual/physical register map unit 136 is connected to map silo 32 and to provide source PR#s, source IQ#s, destination PR#s, and an IQ# for each ROP within the line upon a source/destination PR# and IQ# bus 72 to instruction queues 36A–36B. A free list control unit (not shown) is connected to IQ#/PR# control unit 132 via a next free PR# bus 146. Dependency vector generation unit 134 is connected to virtual/physical register map unit 136 to receive the source/destination IQ#s, and is further connected to store address register 138 and store/load forward detect unit 148. Dependency vector generation unit 134 is connected to receive an indication of the ROP types within a line of ROPs upon ROP types bus 150, and is connected to a store address IQ#s bus 78 (including store address IQ# bus 78A from instruction queue 36A). Still further, dependency vector generation unit 134 is connected to dependency vectors bus 68. Store/load forward detect unit 148 is connected to a load hit store data bus 152 from PC silo 48, a store data IQ# bus 154 from IQ#/PR# control unit 132, and an ROP types and PCs bus 156 from decode unit 24.

Generally, dependency vector generation unit 134 is configured to generate a dependency vector for each ROP being dispatched to instruction queues 36A–36B (i.e. each issue position within the line), and to convey that dependency vector upon dependency vectors bus 68 to instruction queues 36A–36B. Dependency vector generation unit 134 receives an indication of the ROP type for each ROP in a line from decode unit 24. For any ROP type, dependency vector generation unit 134 is configured to record operand dependencies within the dependency vector for each source operand. Dependency vector generation unit 134 receives the IQ#s corresponding to each source operand from virtual/physical register map unit 136 and decodes the source IQ#s to set a corresponding dependency indication within the dependency vector.

As mentioned above, the dependency vector is a flexible dependency mechanism allowing for an arbitrary number of dependencies to be indicated for a particular ROP. In the present embodiment, for example, load ROPs are defined to be ordering dependent upon earlier store address ROPs. Accordingly, dependency vector generation unit 134 maintains a store address dependency vector in store address register 138. The store address dependency vector records indications of each outstanding store address ROP (i.e. by IQ# in the present embodiment). Dependency vector generation unit 134 updates the store address dependency vector with an indication of the IQ#s assigned to each store address ROP within the line (identified by the ROP types received from decode unit 24). The destination IQ#s are received from virtual/physical register map unit 136. Each store address ROP is outstanding until the corresponding IQ# is provided by instruction queues 36A–36B on store address IQ#s bus 78 (upon which dependency vector generation unit 134 updates the store address dependency vector to delete the corresponding IQ#).

For each load ROP indicated upon ROP types bus 150, dependency vector generation unit 134 includes the store address dependency vector in the dependency vector generated for that load ROP. More particularly, in one embodiment dependency vectors comprise a bit for each IQ#. If the bit is set, a dependency is recorded on the ROP assigned the corresponding IQ#. In such an embodiment, the store address dependency vector may be ORed with the dependency vectors corresponding to the source operands. In addition to the store address dependency vector stored in store address register 138, dependency vector generation unit 134 may detect store address ROPs within the line of ROPs with a particular load ROP and prior to that particular load ROP within the line. Dependencies are recorded upon the detected store address ROPs in the dependency vector for the particular load ROP as well.

A particular load ROP may further be recorded as dependent on a store data ROP if store/load forward detect unit 148 predicts that the particular load ROP is to experience a load hit store data situation. As described above, load ROPs are ordering dependent upon previous store address ROPs. By enforcing this ordering, dependencies between load ROPs and prior store ROPs accessing the same memory location may be determined. However, since there is no ordering (in general) of load ROPs upon prior store data ROPs, a detection of a dependency by load/store unit 42 may not immediately lead to forwarding of the store data (i.e. if the store data ROP has not yet executed, then the data is not yet available). If the store data cannot yet be forwarded, the load ROP is cancelled and rescheduled at a subsequent clock cycle. Unfortunately, ROPs dependent upon the cancelled load ROP are cancelled as well. For simplicity, instruction queues 36A–36B may cancel all ROPs scheduled subsequent to the cancelled load ROP. In order to avoid the cancellations of ROPs without unduly delaying load ROPs for store data ROPs, store/load forward detect unit 148 is used to predict the load hit store data (with store data unavailable) situation and record a dependency in response to the prediction, if necessary. If a load hit store data situation is predicted, the IQ# of the store data ROP is provided by store/load forward detect unit 148 to dependency vector generation unit 134. Dependency vector generation unit 134 records an ordering dependency upon the store data ROP in the dependency vector of the corresponding load ROP. Store/load forward detect unit 148 may maintain a pair of tables in the present embodiment. The first table is indexed by load PC address and stores a store data PC address upon which a load hit store data situation was previously detected. The second table is indexed by store data PC address and records the IQ# assigned to the store data ROP. Accordingly, store/load forward detect unit 148 indexes the first table with the PCs of each load ROP being mapped by map unit 30 (indicated upon bus 156 from decode unit 24). If the indexed entry indicates that a load hit store data situation is predicted, then the store PC address stored in the indexed entry is used to index the second table. The IQ# in the second table at the indexed entry is conveyed by store/load forward detect unit 148 to dependency vector generation unit 134 for inclusion in the dependency vector of the corresponding load ROP.

Upon detecting a load hit store data situation during execution of a load ROP, load/store unit 42 reports the R# of the load ROP and the R# of the store data ROP upon which the dependency is detected to PC silo 48. PC silo 48 provides the corresponding physical PC addresses of the load ROP and store data ROP upon load hit store data bus 152. Store/load forward detect unit 148 updates the first table at the entry indexed by the load PC address with the store data PC address of the store data ROP upon which a load hit store data situation was detected (and sets an indication that the load hit store data situation was detected). In one embodiment the first table is a 2 KByte, 2 way set associative table in which each entry stores six bits of the store PC address and the corresponding load hit store data indication.

Store/load forward detect unit 148 receives the IQ#s and PC addresses of the store data ROPs being dispatched from IQ#/PR# control unit 132 on bus 154 and records the IQ#s in the entries of the second table as indexed by the corresponding store data PC addresses.

In the embodiment of FIG. 7, map unit 30 performs register renaming using a two stage pipeline design. Other embodiments may perform register renaming in a single pipeline stage or additional stages, as desired. In the first stage, register scan unit 130 assigns virtual register numbers to each source register. In parallel, IQ#/PR# control unit 132 assigns IQ#s (based upon the tail pointers provided by instruction queues 36A–36B) to each ROP and PR#s to the ROPs which have a destination register. In the second stage, virtual/physical register map unit 136 maps the virtual register numbers to physical register numbers (based upon the current lookahead state and the assigned PR#s) and routes the physical register numbers assigned by IQ#/PR# control unit 132 to the issue position of the corresponding ROP.

The virtual register numbers assigned by register scan unit 130 identify a source for the physical register number. For example, in the present embodiment, physical register numbers corresponding to source registers may be drawn from a lookahead register state (which reflects updates corresponding to the lines of ROPs previously processed by map unit 30 and is maintained by virtual/physical register map unit 136) or from a previous issue position within the line of ROPs (if the destination operand of the previous ROP is the same as the source operand . . . i.e. an intraline dependency exists). In other words, the physical register number corresponding to a source register number is the physical register number within the lookahead register state unless an intraline dependency is detected. Register scan unit 130 effectively performs intraline dependency checking. Other embodiments may provide for other sources of source operands, as desired.

IQ#/PR# control unit 132 assigns instruction queue numbers beginning with the tail pointer of one of instruction queues 36A–36B. In other words, the first ROP within the line receives the tail pointer of the selected instruction queue as an IQ#, and other ROPs receive IQ#s in increasing order from the tail pointer. Control unit 132 assigns each of the ROPs in a line to the same instruction queue 36A–36B, and allocates the next line of ROPs to the other instruction queue 36A–36B. Control unit 132 conveys an indication of the number of ROPs allocated to the instruction queue 36A–36B via ROP allocate bus 70B (a portion of tail pointer control bus 70 shown in FIG. 2). The receiving instruction queue may thereby update its tail pointer to reflect the allocation of the ROPs to that queue.

Control unit 132 receives a set of free PR#s from the free list control unit upon next free PR# bus 146. The set of free PR#s are assigned to the destination registers within the line of instruction operations. In one embodiment, processor 10 limits the number of logical register updates within a line to four (i.e. if predictor miss decode unit 26 encounters a fifth logical register update, the line is terminated at the previous instruction). Hence, the free list control unit selects four PR#s from the free list and conveys the selected registers to control unit 132 upon next free PR# bus 146. Other embodiments may employ different limits to the number of updates within a line, including no limit (i.e. each ROP may update).

The free list control unit manages the freeing of physical registers and selects registers for assignment to subsequent instructions. The free list control unit receives the previous physical register numbers popped from architectural renames block 34, which also cams the previous physical register numbers against the updated set of architectural renames. Each previous PR# for which a corresponding cam match is not detected is added to the free list.

Virtual/physical register map unit 136 supplies the PR# and IQ# of the corresponding logical register as indicated by the lookahead register state for each source register having a virtual register number indicating that the source of the PR# is the lookahead register state. Source registers for which the virtual register number indicates a prior issue position are supplied with the corresponding PR# and IQ# assigned by control unit 132. Furthermore, virtual/physical register map unit 136 updates the lookahead register state according to the logical destination registers specified by the line of ROPs and the destination PR#s/IQ#s assigned by control unit 132.

Virtual/physical register map unit 136 is further configured to receive a recovery lookahead register state provided by map silo 32 in response to an exception condition. Virtual/physical register map unit 136 may override the next lookahead register state generated according to inputs from register scan unit 130 and IQ#/PR# control unit 132 with the recovery lookahead state provided by map silo 32.

It is noted that, in the present embodiment, IQ#s are routed for each source operand to indicate which instruction queue entries the corresponding ROP is dependent upon. Instruction queues 36A–36B await completion of the ROPs in the corresponding instruction queue entries before scheduling the dependent ROP for execution.

Figure 8:
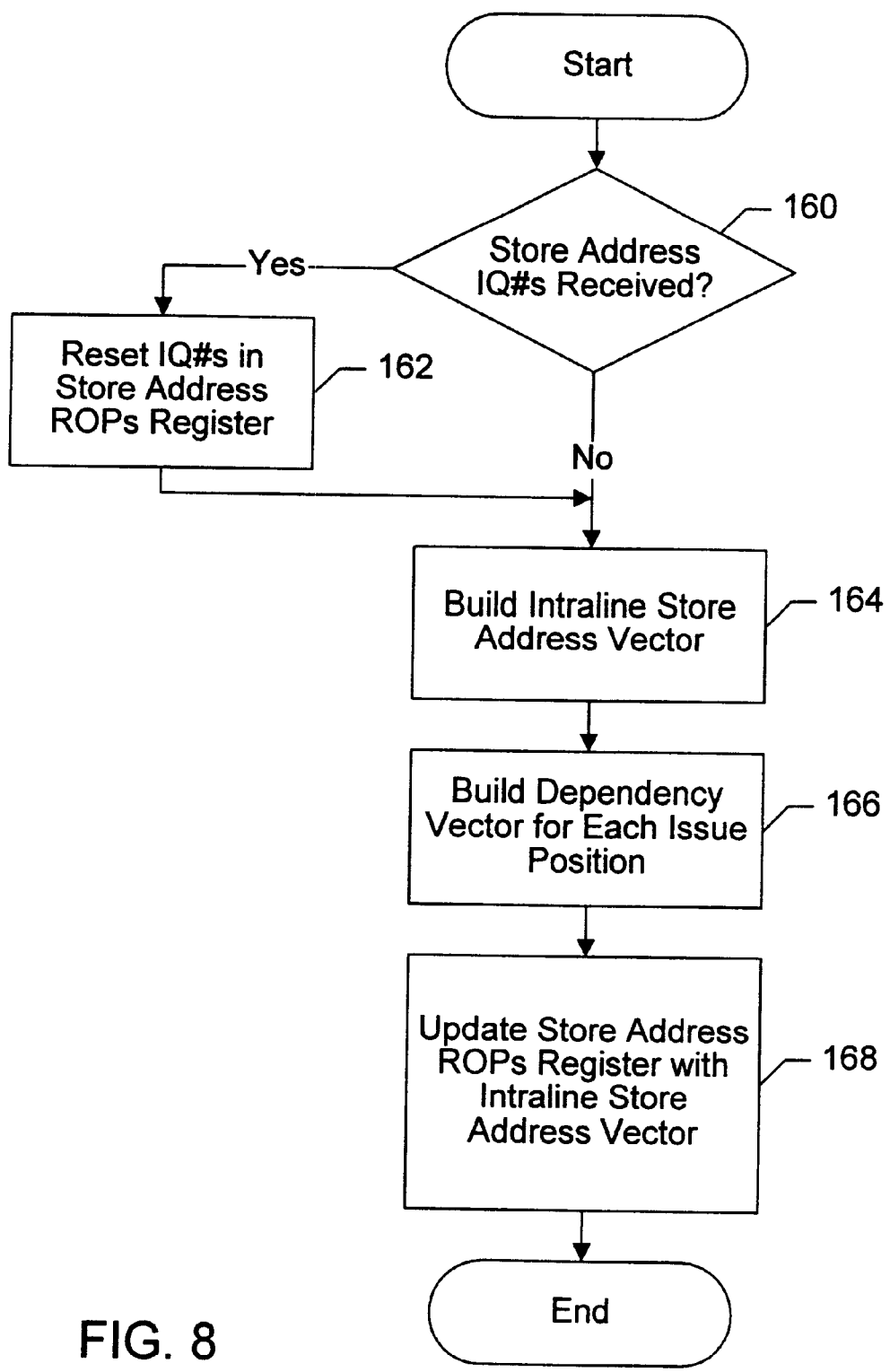
FIG. 8 is a flowchart illustrating operation of one embodiment of a dependency vector generation unit shown in FIG. 7.

Turning now to FIG. 8, a flowchart is shown illustrating operation of one embodiment of dependency vector generation unit 134. Other embodiments are possible and contemplated. While the steps are shown in a particular order in FIG. 8 for ease of understanding, any order may be suitable. Furthermore, various steps may be performed in parallel in combinatorial logic within dependency vector generation unit 134.

Dependency vector generation unit 134 determines if one or more store address IQ#s are received from instruction queues 36A–36B (decision block 160). If a store address IQ# is received, dependency vector generation unit 134 deletes the corresponding dependency indication within the store address dependency vector (step 162). For example, in an embodiment in which the dependency vector includes a bit for each IQ# indicating dependency when set, the bit corresponding to the received IQ# is reset (or cleared).

Figure 9:
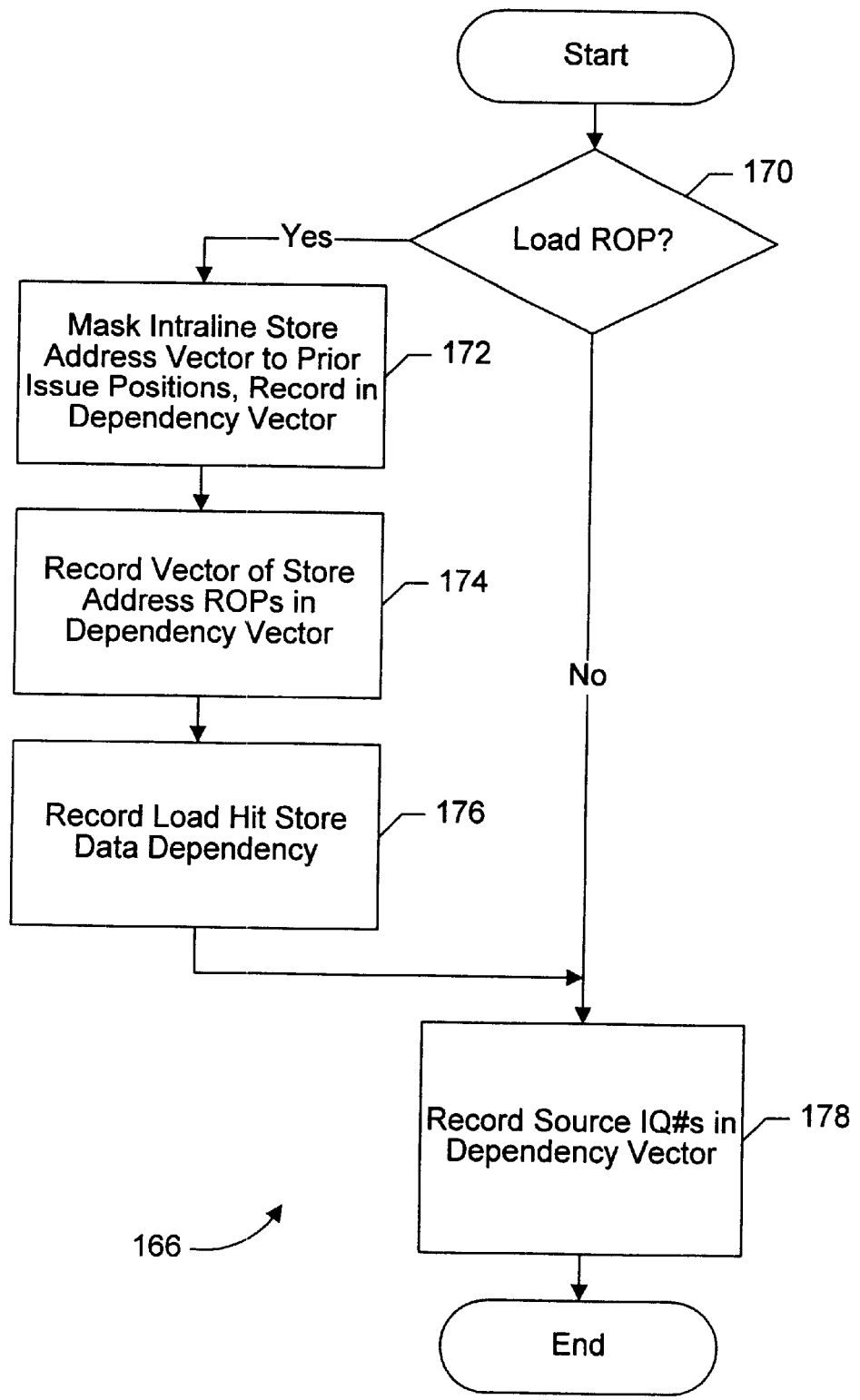
FIG. 9 is a flowchart illustrating one embodiment of a step shown in FIG. 8.

Dependency vector generation unit 134 builds an intraline store address dependency vector (step 164). The intraline store address dependency vector records dependency indications for each store address ROP within the line of ROPs being processed by dependency vector generation unit 134. Dependency vector generation unit 134 builds a dependency vector for each ROP within the line of ROPs (i.e. a dependency vector corresponding to each issue position having a valid ROP) (step 166). The building of a dependency vector for a particular issue position according to one embodiment of dependency vector generation unit 134 is illustrated in FIG. 9 below. Finally, dependency vector generation unit 134 merges the store address dependency vector stored in store address register 138 with the intraline store address dependency vector and updates store address register 138 with the result (step 168).

Turning next to FIG. 9, a flowchart is shown illustrating the building of a dependency vector for an ROP according to one embodiment of dependency vector generation unit 134 (i.e. step 166 shown in FIG. 8). The steps shown in FIG. 9 may be performed for each ROP within the line. Other embodiments are possible and contemplated. While the steps are shown in a particular order in FIG. 8 for ease of understanding, any order may be suitable. Furthermore, various steps may be performed in parallel in combinatorial logic within dependency vector generation unit 134.

Dependency vector generation unit 134 determines if the ROP for which the dependency vector is being built is a load ROP (decision block 170). As mentioned above, the type of each ROP within the line is provided to dependency vector generation unit 134 by decode unit 24, from which dependency vector generation unit 134 may determine which ROPs are load ROPs. If the ROP is a load ROP, dependency vector generation unit 134 masks the intraline store address dependency vector to the issue positions prior to the load ROP and records the masked indications in the dependency vector (step 172). In other words, the dependency indications corresponding to store address ROPs prior to the load ROP within the line are included in the dependency vector, dependency indications corresponding to store address ROPs subsequent to the load ROP are not included. The dependency indications corresponding to store address ROPs subsequent to the load ROP are masked off, since no dependency on the subsequent store address ROPs should be noted for the load ROP.

Additionally, the store address dependency vector stored in store address register 138 is recorded in the dependency vector if the ROP is a load ROP (step 174). Still further, if a load hit store data situation is predicted by store/load forward detection unit 148, a dependency is recorded upon the predicted store data ROP (step 176).

For each ROP, dependencies upon the source IQ#s provided by virtual/physical register map unit 136 are recorded (step 178). It is noted that, in one embodiment, each dependency vector comprises a bit for each IQ# indicating, when set, a dependency upon the ROP assigned that IQ# and indicating, when clear, a lack of dependency upon that IQ#. Accordingly, recording dependencies from various sources may comprise ORing the dependency vectors from the various sources. Alternatively, each source of a dependency may indicate which bits within the dependency vector to set.

Figure 10:
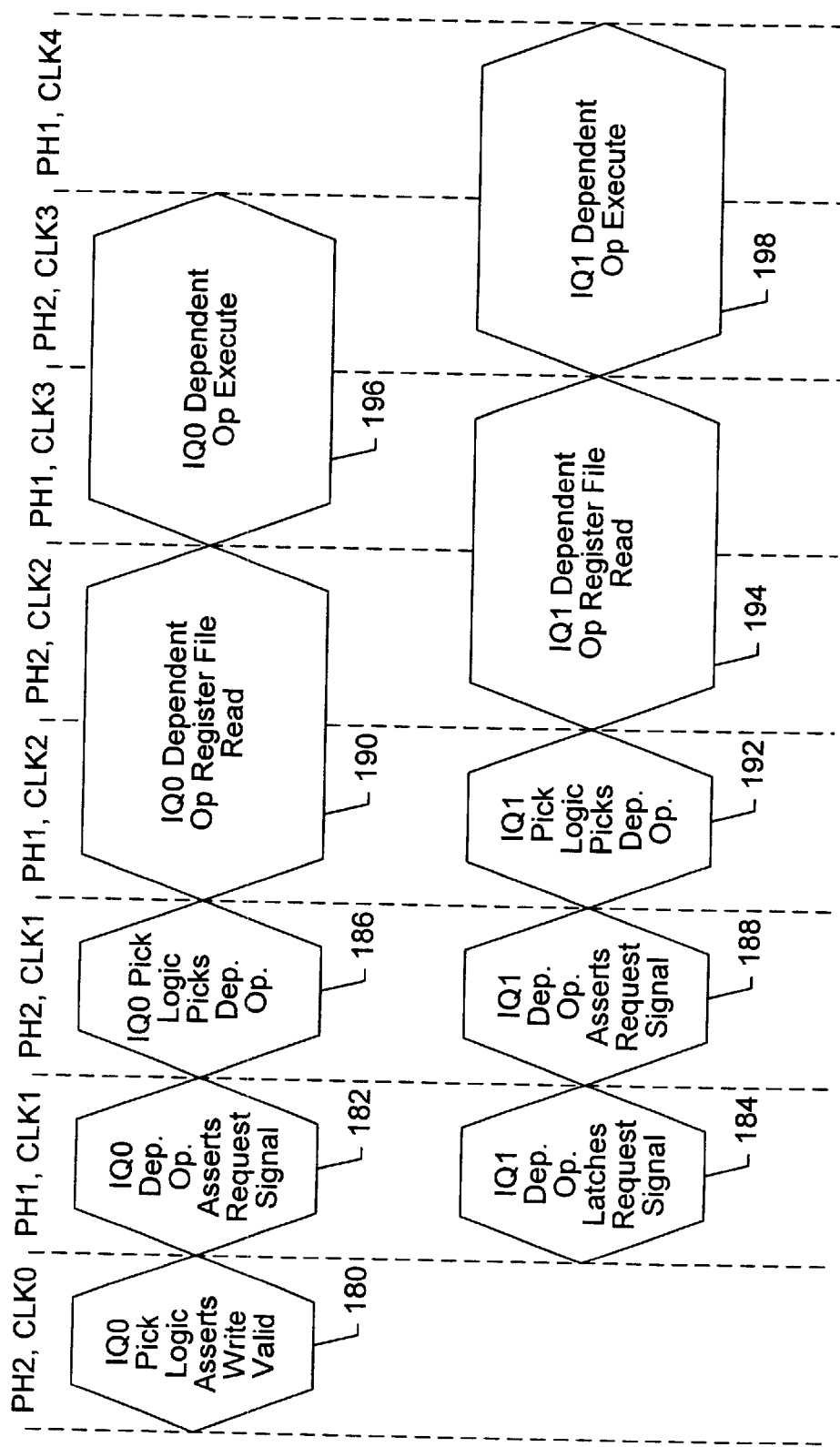
FIG. 10 is a timing diagram illustrating operation of one embodiment of a pair of instruction queues shown in FIG. 1.

Turning now to FIG. 10, a timing diagram is shown illustrating operation of one embodiment of instruction queues 36A–36B is shown. Phases of the clock cycle are delimited by vertical dashed lines. Each phase and each clock cycle are indicated via labels at the top of delimited area The timing diagram of FIG. 10 illustrates the timing of an ROP being indicated as completed (such that dependent ROPs may be scheduled) via assertion of the write valid line and the scheduling of a dependent ROP in each instruction queue.

During the PH2 phase of clock 0, the pick logic within instruction queue 36A asserts a write valid signal for an ROP (reference numeral 180). During the PH1 phase of clock 1, a scheduling request signal for a first dependent ROP is evaluated in second storage 90B and asserted (assuming no other dependencies are still active—reference numeral 182). Additionally, an intermediate scheduling request signal for a second dependent ROP is evaluated in second storage 90D and asserted (again assuming no other dependencies are still active). PH1 latch 94B latches the asserted intermediate scheduling request signal (reference numeral 184).

During the PH2 phase of clock 1, the pick logic within instruction queue 36A schedules the first dependent ROP from instruction queue 36A for execution (reference numeral 186). Additionally, the second dependent ROP is evaluated in first storage 90C of instruction queue 36B, and the corresponding request signal is asserted (assuming no other dependencies are active—reference numeral 188).

During the PH1 phase of clock 2, register file 38A initiates a register file read for the source operands of the first dependent ROP. The register file read completes in the PH2 phase of clock 2 (reference numeral 190). Also during the PH1 phase of clock 2, the pick logic within instruction queue 36B schedules the second dependent ROP for execution (reference numeral 192). Register file 38B initiates a register file read for the source operands of the second dependent ROP during the PH2 phase of clock 2, with the register file read completing during the PH1 phase of clock 3 (reference numeral 194). Execution core 40A initiates execution of the first dependent ROP during the PH1 phase of clock 3, completing execution during the PH2 phase of clock 3 (reference numeral 196). Similarly, execution core 40B initiates execution of the dependent ROP during the PH2 phase of clock 3 and completes execution during the PH1 phase of clock 4 (reference numeral 198).

By evaluating the dependency vectors in portions (as illustrated in FIG. 4 and FIG. 10), a higher frequency of operation may be achievable than if the entire dependency vector were evaluated concurrently. While one of the portions is being evaluated, the other portion may be precharging. Performance of processor 10 may be increased as a result of the higher frequency. By operating instruction queue 36A ½ clock cycle off of instruction queue 36B (and similarly operating register file 38A ½ clock cycle off of register file 38B and execution core 40A ½ clock cycle off of execution core 40B), the higher frequency may be realized with only ½ clock cycle employed to propagate the completion of an ROP to a dependent ROP stored in the opposite instruction queue. In addition, the ½ clock cycle of time may be used to propagate the result of the ROP to the register file which the dependent ROP will read to access the results. Overall instruction throughput may be increased over an embodiment in which a full clock cycle is used to propagate between queues.

It is noted that, while in the present embodiment the instruction queue is physically divided into instruction queues 36A–36B, other embodiments may divide the instruction queue into even larger numbers of physical queues which may operate independently. For example, an embodiment employing four instruction queues might be employed (with four register files and four execution cores). The number of instruction queues may be any suitable number. Furthermore, evaluating dependency vectors may be divided into more than two portions evaluated in consecutive phases, as desired.

Figure 11:
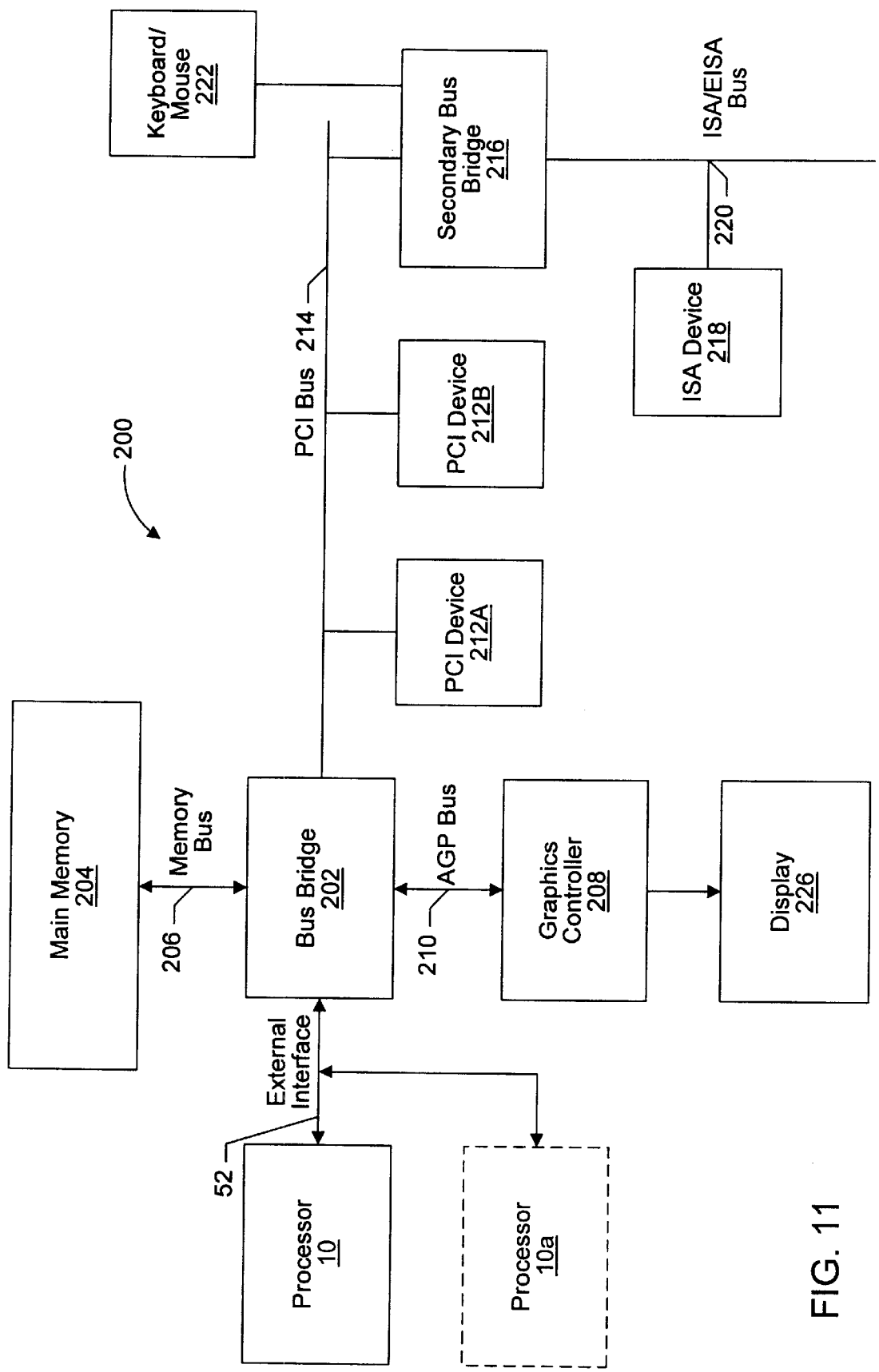
FIG. 11 is a block diagram of one embodiment of a computer system including the processor shown in FIG. 1.

Turning now to FIG. 11, a block diagram of one embodiment of a computer system 200 including processor 10 coupled to a variety of system components through a bus bridge 202 is shown. Other embodiments are possible and contemplated. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Processor 10 is coupled to bus bridge 202 through external interface 52.

Bus bridge 202 provides an interface between processor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to external interface 52 between processor 10 and bus bridge 202 in other embodiments. Alternatively, the external cache may be coupled to bus bridge 202 and cache control logic for the external cache may be integrated into bus bridge 202.

Main memory 204 is a memory in which application programs are stored and from which processor 10 primarily executes. A suitable main memory 204 comprises DRAM (Dynamic Random Access Memory), and preferably a plurality of banks of SDRAM (Synchronous DRAM).

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCL and ISA or EISA buses have been used as examples in the above description, any bus architectures may be substituted as desired. It is further noted that computer system 200 may be a multiprocessing computer system including additional processors (e.g. processor 10a shown as an optional component of computer system 200). Processor 10a may be similar to processor 10. More particularly, processor 10a may be an identical copy of processor 10. Processor 10a may share external interface 52 with processor 10 (as shown in FIG. 11) or may be connected to bus bridge 202 via an independent bus.

Numerous variations and modifications will become apparent to those skilled in the art once the above disclosure is fully appreciated. It is intended that the following claims be interpreted to embrace all such variations and modifications.

What is claimed is:

1. A processor comprising:
   a dependency vector generation unit configured to generate a dependency vector corresponding to a first instruction operation, wherein the dependency vector is indicative of an ordering dependency between the first instruction operation and a prior instruction operation if the first instruction operation is required to execute after the prior instruction operation independent of whether or not a result of the prior instruction operation is used during execution of the first instruction operation; and
   an instruction queue coupled to receive the dependency vector and the first instruction operation, wherein the instruction queue is configured to inhibit scheduling of the first instruction operation until each dependency indicated within the dependency vector is satisfied.

2. The processor as recited in claim 1 wherein the dependency vector comprises an indication corresponding to each of a plurality of queue entries within the instruction queue.

3. The processor as recited in claim 2 further comprising a second instruction queue coupled to the dependency vector generation unit and to the instruction queue.

4. The processor as recited in claim 3 wherein the dependency vector further comprises an indication corresponding to each of a second plurality of queue entries within the second instruction queue.

5. The processor as recited in claim 4 wherein the indication comprises a bit indicative, when set, of a dependency upon a corresponding entry from one of the plurality of queue entries or the second plurality of queue entries, and indicative, when clear, of a lack of the dependency upon the corresponding entry from one of the plurality of queue entries and the second plurality of queue entries.

6. The processor as recited in claim 1 wherein the first instruction operation is ordering dependent on the prior instruction operation if the prior instruction operation is a store address instruction operation and the first instruction operation is a load instruction operation, wherein the store address instruction operation is defined to generate an address of a store but not supply the data of the store.

7. The processor as recited in claim 6 wherein the first instruction operation is ordering dependent on each prior store address instruction operation.

8. The processor as recited in claim 6 wherein the ordering dependency is satisfied in response to executing the prior store address instruction operation.

9. The processor as recited in claim 1 wherein the ordering dependency comprises a store-load forward dependency.

10. The processor as recited in claim 9 wherein the store-load forward dependency is satisfied in response to executing a store data instruction operation identified by the store-load forward dependency, wherein the store data instruction operation is defined to supply the data of a store but not generate an address of the store.

11. The processor as recited in claim 1 wherein the first instruction operation is ordering dependent on the prior instruction operation if the first instruction operation is a synchronizing instruction operation, regardless of a type of the prior instruction operation.

12. The processor as recited in claim 1 wherein the first instruction operation is ordering dependent on the prior instruction operation if the prior instruction operation is a synchronizing instruction operation, regardless of a type of the first instruction operation.

13. The processor as recited in claim 1 wherein the dependency vector is further indicative of an operand dependency between the first instruction operation and a second prior instruction operation.

14. The processor as recited in claim 13 wherein the operand dependency is satisfied in response to generating the operand as a result of the second prior instruction operation.

15. A method comprising:
generating a dependency vector corresponding to a first instruction operation, the dependency vector indicating an ordering dependency between the first instruction operation and a prior instruction operation if the first instruction operation is required to execute after the prior instruction operation independent of whether or not a result of the prior instruction operation is used during execution of the first instruction operation;
storing the dependency vector and the first instruction operation in an instruction queue;
satisfying the ordering dependency; and
scheduling the first instruction operation responsive to the satisfying.

16. The method as recited in claim 15 wherein the first instruction operation is ordering dependent on the prior instruction operation if the prior instruction operation is a store address instruction operation and the first instruction operation is a load instruction operation, wherein the store address instruction operation is defined to generate an address of a store but not supply the data of the store.

17. The method as recited in claim 16 wherein the first instruction operation is ordering dependent on each prior store address instruction operation.

18. The method as recited in claim 16 further comprising executing the prior store address instruction operation, wherein the satisfying occurs in response to the executing.

19. The method as recited in claim 15 wherein the ordering dependency comprises a store-load forward dependency.

20. The method as recited in claim 19 further comprising executing a store data instruction operation identified by the store-load forward dependency, wherein the satisfying occurs in response to the executing, wherein the store data instruction operation is defined to supply the data of a store but not generate an address of the store.

21. The method as recited in claim 15 wherein the first instruction operation is ordering dependent on the prior instruction operation if the first instruction operation is a synchronizing instruction operation, regardless of a type of the prior instruction operation.

22. The method as recited in claim 15 wherein the first instruction operation is ordering dependent on the prior instruction operation if the prior instruction operation is a synchronizing instruction operation, regardless of a type of the first instruction operation.

23. A computer system comprising:
a processor including:
a dependency vector generation unit configured to generate a dependency vector corresponding to a first instruction operation, wherein the dependency vector is indicative of an ordering dependency between the first instruction operation and a prior instruction operation if the first instruction operation is required to execute after the prior instruction operation independent of whether or not a result of the prior instruction operation is used during execution of the first instruction operation; and
an instruction queue coupled to receive the dependency vector and the first instruction operation, wherein the instruction queue is configured to inhibit scheduling of the first instruction operation until each dependency indicated within the dependency vector is satisfied; and
a peripheral device for communicating between the computer system and another computer system.

24. The computer system as recited in claim 23 wherein the peripheral device is a modem.

25. The computer system as recited in claim 23 further comprising an audio peripheral device.

26. The computer system as recited in claim 25 wherein the audio peripheral device includes a sound card.

27. The computer system as recited in claim 23 further comprising a second processor including:
a second dependency vector generation unit configured to generate a second dependency vector corresponding to a second instruction operation, wherein the second dependency vector is indicative of an ordering dependency between the second instruction operation and a second prior instruction operation if the second instruction operation is required to execute after the second prior instruction operation even if the second instruction operation does not have an operand dependency on the second prior instruction operation; and a second instruction queue coupled to receive the second dependency vector and the second instruction operation, wherein the second instruction queue is configured to inhibit scheduling of the second instruction operation until each dependency indicated within the second dependency vector is satisfied.

28. A processor comprising:

a dependency vector generation unit configured to generate a dependency vector corresponding to a first instruction operation, wherein the dependency vector is indicative of an ordering dependency between the first instruction operation and a prior instruction operation if the prior instruction operation is a store address instruction operation and the first instruction operation is a load instruction operation even if the first instruction operation does not have an operand dependency on the prior instruction operation, wherein the store address instruction operation is defined to generate an address of a store but not supply the data of the store; and an instruction queue coupled to receive the dependency vector and the first instruction operation, wherein the instruction queue is configured to inhibit scheduling of the first instruction operation until each dependency indicated within the dependency vector is satisfied.

29. The processor as recited in claim 28 wherein the first instruction operation is ordering dependent on each prior store address instruction operation.

30. The processor as recited in claim 28 wherein the ordering dependency is satisfied in response to executing the prior store address instruction operation.

31. A processor comprising:

a dependency vector generation unit configured to generate a dependency vector corresponding to a first instruction operation, wherein the dependency vector is indicative of a store-load forward dependency between the first instruction operation and a prior instruction operation if the store-load forward dependency is predicted even if the first instruction operation does not have an operand dependency on the prior instruction operation; and an instruction queue coupled to receive the dependency vector and the first instruction operation, wherein the instruction queue is configured to inhibit scheduling of the first instruction operation until each dependency indicated within the dependency vector is satisfied.

32. The processor as recited in claim 31 wherein the store-load forward dependency is satisfied in response to executing a store data instruction operation identified by the store-load forward dependency, wherein the store data instruction operation is defined to supply the data of a store but not generate an address of the store.

33. A processor comprising:

a dependency vector generation unit configured to generate a dependency vector corresponding to a first instruction operation, wherein the dependency vector is indicative of an ordering dependency between the first instruction operation and a prior instruction operation if the first instruction operation is a synchronizing instruction operation, regardless of a type of the prior instruction operation, even if the first instruction operation does not have an operand dependency on the prior instruction operation; and an instruction queue coupled to receive the dependency vector and the first instruction operation, wherein the instruction queue is configured to inhibit scheduling of the first instruction operation until each dependency indicated within the dependency vector is satisfied.

34. A processor comprising:

a dependency vector generation unit configured to generate a dependency vector corresponding to a first instruction operation, wherein the dependency vector is indicative of an ordering dependency between the first instruction operation and a prior instruction operation if the prior instruction operation is a synchronizing instruction operation, regardless of a type of the first instruction operation, even if the first instruction operation does not have an operand dependency on the prior instruction operation; and an instruction queue coupled to receive the dependency vector and the first instruction operation, wherein the instruction queue is configured to inhibit scheduling of the first instruction operation until each dependency indicated within the dependency vector is satisfied.

* * * * *